US011269211B2

(12) United States Patent
Yi et al.

(10) Patent No.: US 11,269,211 B2
(45) Date of Patent: Mar. 8, 2022

(54) DISPLAY DEVICE

(71) Applicant: LG ELECTRONICS INC., Seoul (KR)

(72) Inventors: Changhwan Yi, Seoul (KR); Dongho Ham, Seoul (KR); Sangyeol Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/828,767

(22) Filed: Mar. 24, 2020

(65) Prior Publication Data
US 2020/0348560 A1 Nov. 5, 2020

(30) Foreign Application Priority Data

May 3, 2019 (KR) .......................... 10-2019-0052196

(51) Int. Cl.
*G02F 1/1335* (2006.01)
*G02F 1/1333* (2006.01)
(Continued)

(52) U.S. Cl.
CPC ...... *G02F 1/133514* (2013.01); *G02F 1/1339* (2013.01); *G02F 1/1368* (2013.01);
(Continued)

(58) Field of Classification Search
CPC .. G02B 6/0068; G02B 6/0055; G02B 6/0051; G02B 6/0088; G02F 1/01791;
(Continued)

(56) References Cited

U.S. PATENT DOCUMENTS

2004/0189588 A1* 9/2004 Dong ................ G02F 1/133615
345/102
2008/0137336 A1* 6/2008 Choi ................ G02F 1/133603
362/249.01
(Continued)

FOREIGN PATENT DOCUMENTS

JP 2001-272652 10/2001
JP 2010-134269 6/2010
(Continued)

OTHER PUBLICATIONS

PCT International Application No. PCT/KR2019/009397, International Search Report dated Feb. 3, 2020, 3 pages.

*Primary Examiner* — Thoi V Duong
(74) *Attorney, Agent, or Firm* — Lee, Hong, Degerman, Kang & Waimey PC

(57) ABSTRACT

A display device is disclosed. An embodiment of the display device includes a display panel, a plurality of light assemblies configured to provide light to the display panel, a light absorbing layer positioned on a path of light that is provided to the display panel by the plurality of light assemblies, the light absorbing layer configured to absorb light of a predetermined wavelength range, and a light shielding layer between the light assembly and the display panel, wherein the light shielding layer is configured to simultaneously shield the light provided by the plurality of light assemblies at a first portion and allow the light provided by the plurality of light assemblies to pass at a second portion.

20 Claims, 24 Drawing Sheets

(51) Int. Cl.
*G02F 1/1343* (2006.01)
*G02F 1/1368* (2006.01)
*G02F 1/1339* (2006.01)
*G02F 1/1345* (2006.01)
*G02F 1/13357* (2006.01)

(52) U.S. Cl.
CPC .... *G02F 1/13452* (2013.01); *G02F 1/133512* (2013.01); *G02F 1/133528* (2013.01); *G02F 1/133601* (2021.01); *G02F 1/133621* (2013.01); *G02F 1/134309* (2013.01); *G02F 1/133614* (2021.01); *G02F 2201/08* (2013.01); *G02F 2201/121* (2013.01); *G02F 2201/123* (2013.01); *G02F 2203/055* (2013.01)

(58) Field of Classification Search
CPC .... G02F 1/1333; G02F 1/1335; G02F 1/1336; G02F 1/133601; G02F 1/133602; G02F 1/1362; G02F 1/133603; G02F 1/133512; G02F 1/133606; G02F 1/1343; G02F 1/1345; G02F 1/13458; G02F 1/133509; G02F 1/133524; G02F 1/133514; G02F 1/133611; G02F 1/1368; G02F 1/13306; G02F 1/133614; G02F 1/133617; G02F 1/134309; G02F 1/13471; G02F 1/133; G02F 1/133528; G02F 1/133621; G02F 1/1339; G02F 1/13452; G02F 2201/08; G02F 2201/121; G02F 2201/123; G02F 2203/055; G02F 2/02

See application file for complete search history.

(56) References Cited

U.S. PATENT DOCUMENTS

| | | | |
|---|---|---|---|
| 2009/0040423 A1* | 2/2009 | Bae | G02F 1/133606 349/62 |
| 2009/0322990 A1* | 12/2009 | Kawana | G02B 6/0073 349/68 |
| 2013/0015461 A1* | 1/2013 | Lin | H01L 25/0753 257/76 |
| 2018/0203293 A1 | 7/2018 | Lee et al. | |
| 2019/0094576 A1* | 3/2019 | Wang | G02F 1/1323 |
| 2019/0121174 A1* | 4/2019 | Lee | G02F 1/1335 |

FOREIGN PATENT DOCUMENTS

KR 10-2017-0027248 3/2017
KR 10-2018-0079572 7/2018

* cited by examiner

DISPLAY DEVICE

Pursuant to 35 U.S.C. § 119(a), this application claims the benefit of earlier filing date and right of priority to Korean Patent Application No. 10-2019-0052196, filed on May 3, 2019, the contents of which are all hereby incorporated by reference herein in its entirety.

BACKGROUND OF THE INVENTION

With the development of the information society, various demands for display devices are increasing. Various display devices such as liquid crystal displays (LCDs), plasma display panels (PDPs), electroluminescent displays (ELDs), and vacuum fluorescent displays (VFDs) have been recently studied and used in response to various demands for the display devices.

Among the display devices, a liquid crystal display panel of a liquid crystal display includes a liquid crystal layer and a thin film transistor (TFT) substrate and a color filter substrate that are positioned opposite each other with the liquid crystal layer interposed therebetween. The liquid crystal display panel can display an image using light provided by a backlight unit.

As interest in image quality of the display device recently increases, color representation or color reproducibility close to a true color is receiving significant attention, and many studies have been made on improvement in image quality for implementing the true color.

SUMMARY OF THE INVENTION

An object of the present disclosure is to address the above-described and other problems.

Another object of the present disclosure is to provide a display device capable of improving image quality.

Another object of the present disclosure is to provide a display device capable of improving color reproducibility.

Another object of the present disclosure is to provide a display device capable of efficiently controlling a wavelength of light provided by a backlight unit.

To achieve the above-described and other objects, in one aspect of the present disclosure, there is provided a display device comprising a display panel; a light assembly configured to provide light to the display panel; a light absorbing layer positioned on a path of light that is provided to the display panel by the light assembly, the light absorbing layer absorbing light of a predetermined range wavelength; and a light shielding layer between the light assembly and the display panel, the light shielding layer shielding or passing at least a portion of light provided by the light assembly.

According to another aspect of the present disclosure, the display panel may include a front substrate and a rear substrate opposite the front substrate, the light absorbing layer may be positioned or formed in front of the front substrate, and the light shielding layer may be positioned or formed in rear of the rear substrate.

According to another aspect of the present disclosure, the display device may further comprise a front polarizing layer on a front surface of the front substrate; and a rear polarizing layer on a rear surface of the rear substrate, and the light shielding layer may be combined or attached to the rear polarizing layer.

According to another aspect of the present disclosure, the light shielding layer may include a front film; a rear film opposite the front film; a liquid crystal layer filled between the front film and the rear film; and a thin film transistor (TFT) on the front film or the rear film, the TFT configured to control a voltage provided to the liquid crystal layer.

According to another aspect of the present disclosure, the display device may further comprise a common electrode on a rear surface of the front film; and a pixel electrode on a front surface of the rear film, and the TFT may be formed on the front surface of the rear film and electrically connected to the pixel electrode.

According to another aspect of the present disclosure, the display device may further comprise a sealant formed between the front film and the rear film at an edge of the display panel, and the sealant may fix the front film to the rear film and seals the liquid crystal layer.

According to another aspect of the present disclosure, the display device may further comprise a connection pad adjacent to one end of the rear film, positioned on the front surface of the rear film, and electrically connected to the TFT; and a wire electrically connected to the connection pad.

According to another aspect of the present disclosure, the light assembly may include a plurality of light assemblies forming a first matrix, and the light shielding layer may include a plurality of light shielding pixels that forms a second matrix and shields light provided by the plurality of light assemblies.

According to another aspect of the present disclosure, a number of elements of the second matrix may be equal to a number of elements of the first matrix.

According to another aspect of the present disclosure, a number of elements of the second matrix may be greater than a number of elements of the first matrix.

According to another aspect of the present disclosure, a number of elements of the second matrix may be less than a number of pixels of the display panel.

According to another aspect of the present disclosure, the light assembly may provide light in which an intensity of green-based light is 25% to 38% and an intensity of red-based light is 14% to 32% based on intensity 100% of blue-based light.

According to another aspect of the present disclosure, the light absorbing layer may absorb light of a wavelength band between 540 nm and 600 nm, and the light assembly may provide light in which an intensity of green-based light is 25% to 38% and an intensity of red-based light is 14% to 32% based on intensity 100% of blue-based light.

According to another aspect of the present disclosure, the light assembly may provide light in which an intensity of green-based light is about 31% and an intensity of red-based light is about 20% based on an intensity of blue-based light.

According to another aspect of the present disclosure, the light absorbing layer may include tetra-aza-porphyrin.

According to another aspect of the present disclosure, the light assembly may include a light source providing blue-based light; an encapsulant covering around the light source; and yellow-based and red-based fluorescent substances distributed within the encapsulant, and a mix ratio of the yellow-based fluorescent substance and the red-based fluorescent substance may be 0.42 to 0.62:0.37 to 0.57.

According to another aspect of the present disclosure, a sum of the mix ratio of the yellow-based fluorescent substance and the red-based fluorescent substance may be 1.

According to another aspect of the present disclosure, the light assembly may include a light source providing blue-based light; an encapsulant covering around the light source; and yellow-based and red-based fluorescent substances distributed within the encapsulant, and a content ratio of the yellow-based fluorescent substance and the red-based fluorescent substance may be 1:0.71 to 0.93.

According to another aspect of the present disclosure, the light assembly may include a light source providing blue-based light; an encapsulant covering around the light source; and yellow-based and red-based fluorescent substances distributed within the encapsulant, and a content ratio of the fluorescent substances may be 4.2 to 6.8% with respect to the encapsulant.

According to another aspect of the present disclosure, a color temperature of an image provided on a front surface of the display panel may be 10,000 to 12,000 K.

Effects of a display device according to the present disclosure are described as follows.

According to at least one aspect of the present disclosure, the present disclosure can improve image quality of the display device.

According to at least one aspect of the present disclosure, the present disclosure can improve color reproducibility.

According to at least one aspect of the present disclosure, the present disclosure can efficiently control a wavelength of light provided by a backlight unit.

Further scope of applicability of the present disclosure will become apparent from the detailed description given blow. However, it should be understood that the detailed description and specific examples, while indicating preferred embodiments of the disclosure, are given by illustration only, since various changes and modifications within the spirit and scope of the disclosure will become apparent to those skilled in the art from this detailed description.

DETAILED DESCRIPTION OF THE EMBODIMENTS

Figure 1:
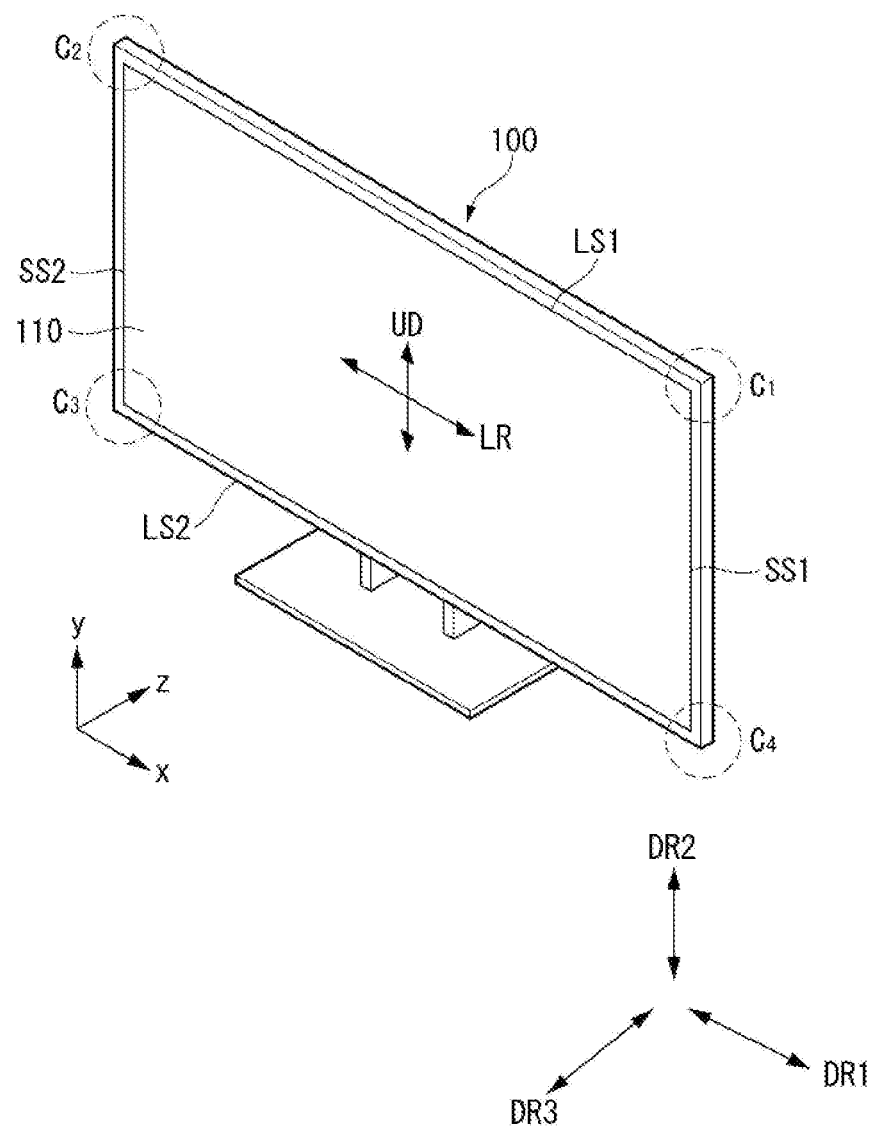
FIGS. 1, 2, 3, 4, 5A, 5B, and 6 illustrate a display device according to embodiments of the present disclosure.

Reference will now be made in detail to embodiments of the disclosure, examples of which are illustrated in the accompanying drawings. Wherever possible, the same reference numbers will be used throughout the drawings to refer to the same or like parts. In general, a suffix such as "module" and "unit" may be used to refer to elements or components. Use of such a suffix herein is merely intended to facilitate description of the specification, and the suffix itself is not intended to give any special meaning or function. It will be noted that a detailed description of known arts will be omitted if it is determined that the detailed description of the known arts can obscure the embodiments of the disclosure. The accompanying drawings are used to help easily understand various technical features, and it should be understood that the embodiments presented herein are not limited by the accompanying drawings. As such, the present disclosure should be construed to extend to any alterations, equivalents and substitutes in addition to those which are particularly set out in the accompanying drawings.

Hereinafter, embodiments of the disclosure are described using a liquid crystal display panel as an example of a display panel, but are not limited thereto.

In embodiments disclosed herein, a display device may include a first long side LS1, a second long side LS2 opposite the first long side LS1, a first short side SS1 adjacent to the first long side LS1 and the second long side LS2, and a second short side SS2 opposite the first short side SS1.

Herein, the first short side SS1 may be referred to as a first side area; the second short side SS2 may be referred to as a second side area opposite the first side area; the first long side LS1 may be referred to as a third side area which is adjacent to the first side area and the second side area and is positioned between the first side area and the second side area; and the second long side LS2 may be referred to as a fourth side area which is adjacent to the first side area and the second side area, is positioned between the first side area and the second side area, and is opposite to the third side area.

Embodiments of the disclosure describe that lengths of the first and second long sides LS1 and LS2 are longer than lengths of the first and second short sides SS1 and SS2 for convenience of explanation. However, the lengths of the first and second long sides LS1 and LS2 may be almost equal to the lengths of the first and second short sides SS1 and SS2.

In the following description, a first direction DR1 may be a direction parallel to the long sides LS1 and LS2 of a display panel 110, and a second direction DR2 may be a direction parallel to the short sides SS1 and SS2 of the display panel 110. Further, a third direction DR3 may be a direction perpendicular to the first direction DR1 and/or the second direction DR2.

The first direction DR1 and the second direction DR2 may be commonly referred to as a horizontal direction. Further, the third direction DR3 may be referred to as a vertical direction.

In another point of view, a side on which the display device displays an image may be referred to as a forward direction or a front side or a front surface. When the display device displays an image, a side at which the image cannot be observed may be referred to as a rearward direction or a rear side or a rear surface. When the display device is observed at the forward direction or the front side or the front surface, the first long side LS1 may be referred to as an upper side or an upper surface. In the same manner, the second long side LS2 may be referred to as a lower side or a lower surface. In the same manner, the first short side SS1 may be referred to as a right side or a right surface, and the second short side SS2 may be referred to as a left side or a left surface.

Further, the first long side LS1, the second long side LS2, the first short side SS1, and the second short side SS2 may be referred to as edges of the display device. Positions where the first long side LS1, the second long side LS2, the first short side SS1, and the second short side SS2 meet one another may be referred to as corners. For example, a position where the first long side LS1 and the first short side SS1 meet each other may be referred to as a first corner C1; a position where the first long side LS1 and the second short side SS2 meet each other may be referred to as a second corner C2; a position where the second short side SS2 and the second long side LS2 meet each other may be referred to as a third corner C3; and a position where the second long side LS2 and the first short side SS1 meet each other may be referred to as a fourth corner C4.

In embodiments disclosed herein, a direction from the first short side SS1 to the second short side SS2 or a direction from the second short side SS2 to the first short side SS1 may be referred to as a left-right direction LR. A direction from the first long side LS1 to the second long side LS2 or from the second long side LS2 to the first long side LS1 may be referred to as an up-down direction UD.

Figure 2:
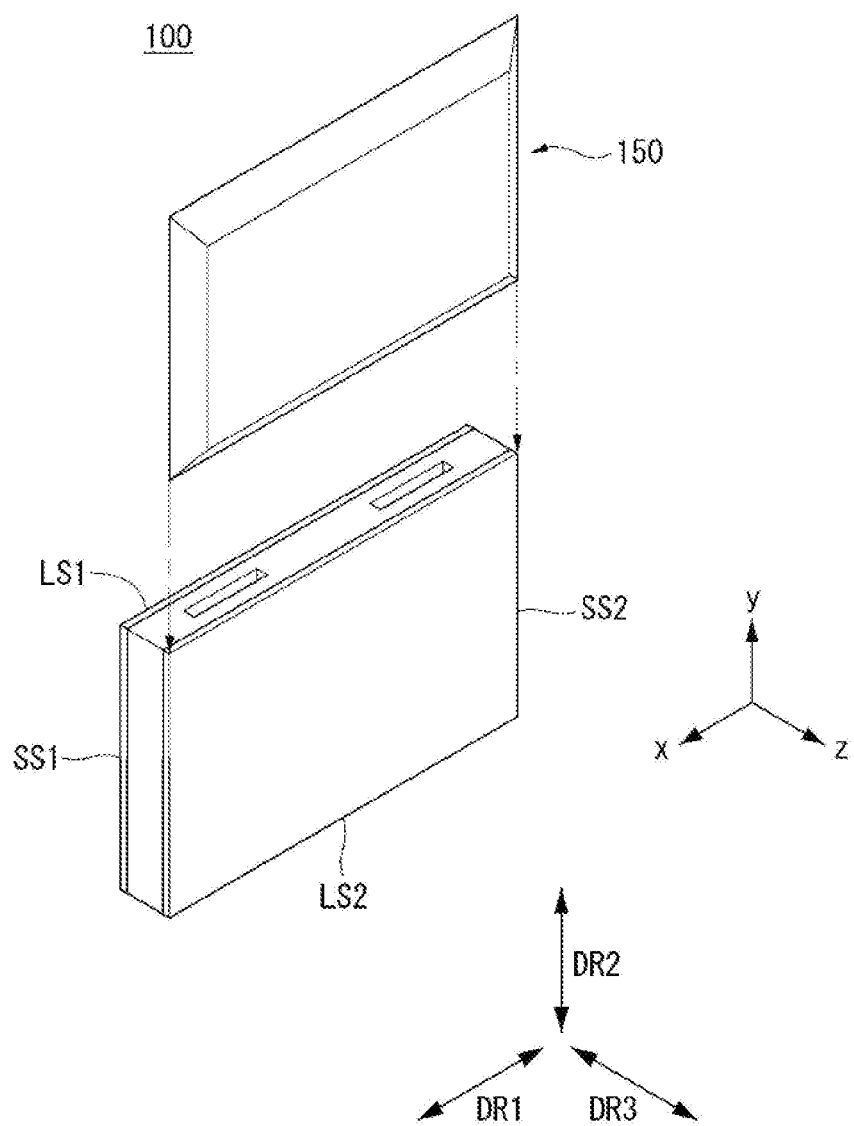

Referring to FIGS. 1 and 2, a back cover 150 may be coupled to a display panel 110. The back cover 150 and/or other components adjacent to the back cover 150 may include a protrusion, a sliding portion, a coupling portion, etc., so that the back cover 150 is coupled to the display panel 110.

Figure 3:
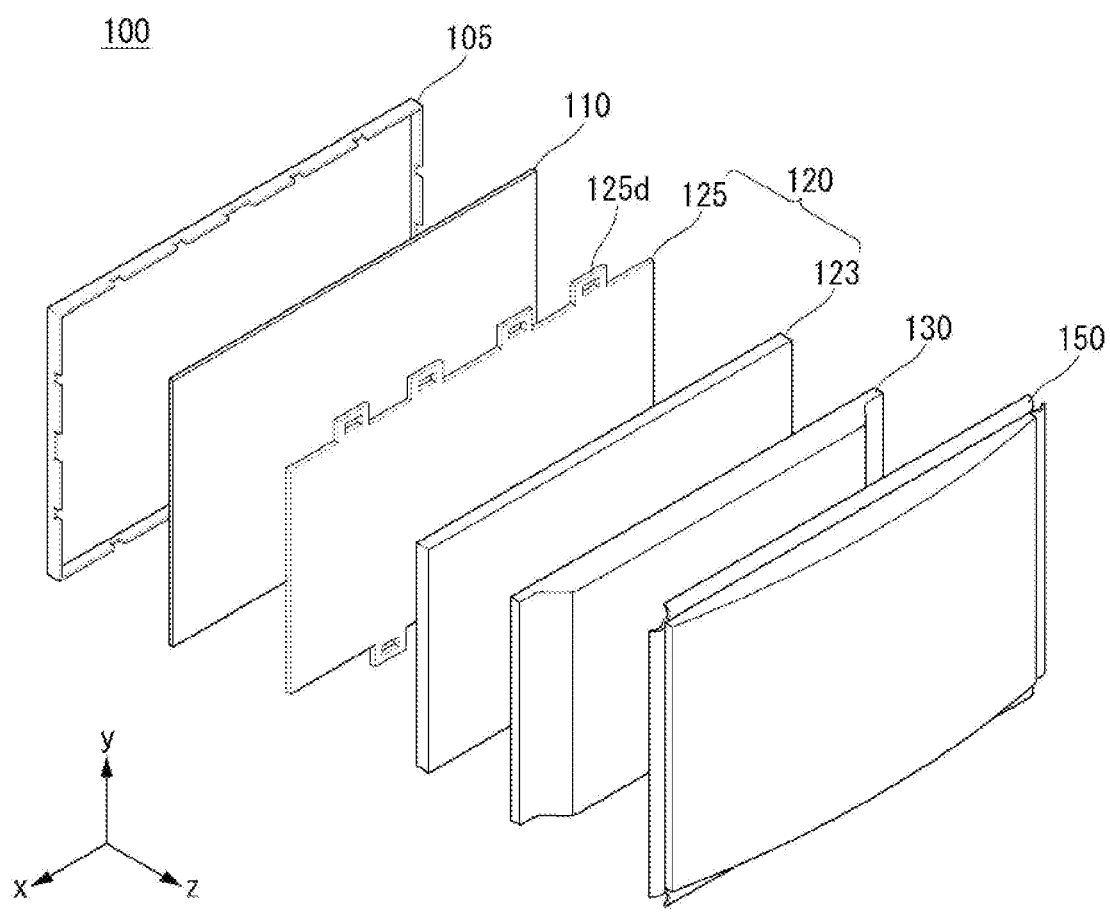

Referring to FIG. 3, a front cover 105 may cover at least a portion of a front surface and a side surface of the display panel 110. The front cover 105 may be divided into a front cover positioned at the front surface of the display panel 110 and a side cover positioned at the side surface of the display panel 110. The front cover and the side cover may be separately configured. One of the front cover and the side cover may be omitted.

The display panel 110 may be provided on a front surface of the display device 100 and may display an image. The display panel 110 may display an image by outputting RGB (red, green or blue) for each of a plurality of pixels in conformity with timing. The display panel 110 may be divided into an active area on which the image is displayed, and a de-active area on which the image is not displayed. The display panel 110 may include a front substrate and a rear substrate that are positioned opposite each other with a liquid crystal layer interposed therebetween.

The front substrate may include a plurality of pixels each including red (R), green (G), and blue (B) subpixels. The front substrate may output light corresponding to red, green, or blue color in response to a control signal.

The rear substrate may include switching elements. The rear substrate may switch on or off pixel electrodes. For example, the pixel electrodes may change a molecule arrangement of the liquid crystal layer in response to a control signal received from the outside. The liquid crystal layer may include liquid crystal molecules. The arrangement of the liquid crystal molecules may be changed depending on a voltage difference between the pixel electrode and a common electrode. The liquid crystal layer may transfer or shield light provided by a backlight unit 120 to the front substrate.

The backlight unit 120 may be positioned at a rear of the display panel 110. The backlight unit 120 may include light sources. The backlight unit 120 may be positioned in front of a frame 130 and may be coupled to the frame 130.

The backlight unit 120 may be driven in an entire driving method or a partial driving method, such as a local dimming method or an impulsive driving method. The backlight unit 120 may include an optical sheet 125 and an optical layer 123.

The optical sheet 125 enables light of the light sources to be uniformly transferred to the display panel 110. The optical sheet 125 may consist of layers. For example, the optical sheet 125 may include a prism sheet, a diffusion sheet, and the like.

The optical sheet 125 may include a coupling portion 125d. The coupling portion 125d may be coupled to the front cover 105, the frame 130, and/or the back cover 150. Alternatively, the coupling portion 125d may be fastened to a structure that is formed or coupled on the front cover 105, the frame 130, and/or the back cover 150.

The frame 130 may function to support the components of the display device 100. For example, configuration such as the backlight unit 120 may be coupled to the frame 130. The frame 130 may be made of a metal material, for example, an aluminum alloy.

The back cover 150 may be positioned at the rear surface or at a rear of the display device 100. The back cover 150 may be coupled to the frame 130 and/or the front cover 105. For example, the back cover 150 may be an injection mold of a resin material.

Figure 4:
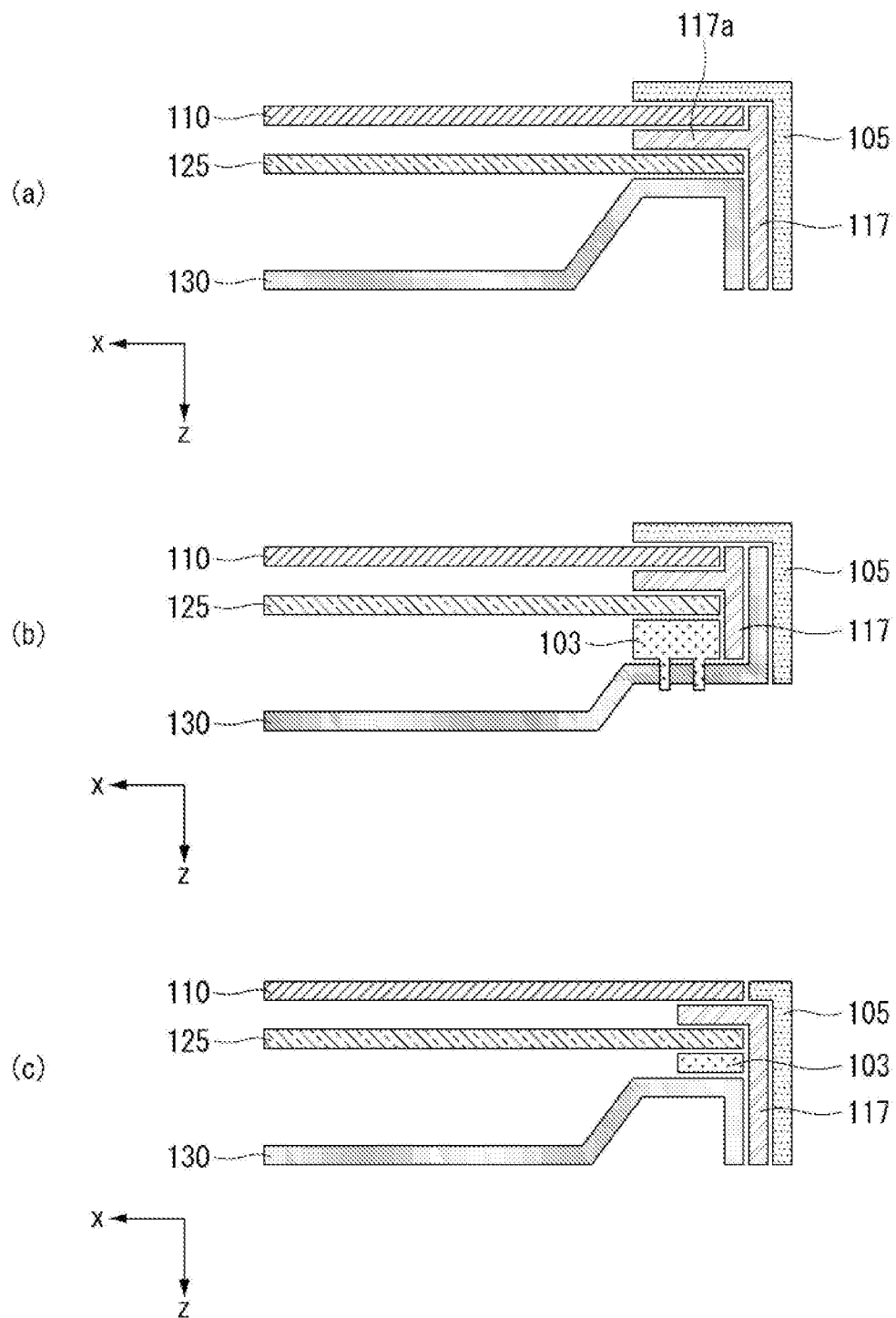

Referring to (a) of FIG. 4, the optical sheet 125 may be positioned in front of the frame 130. The optical sheet 125 may be coupled to the frame 130 at an edge of the frame 130. The optical sheet 125 may be directly placed at the edge of the frame 130. Namely, the optical sheet 125 may be supported by the frame 130. An edge surface of the optical sheet 125 may be covered by a first guide panel 117. For example, the optical sheet 125 may be positioned between the edge of the frame 130 and a flange 117a of the first guide panel 117.

The display panel 110 may be positioned in front of the optical sheet 125. An edge of the display panel 110 may be supported by the first guide panel 117. An edge area of the front surface of the display panel 110 may be covered by the front cover 105. For example, a portion of the display panel 110 may be positioned between the first guide panel 117 and the front cover 105.

Referring to (b) of FIG. 4, the optical sheet 125 may be coupled to a second guide panel 103. That is, the second guide panel 103 may be coupled to the frame 130, and the optical sheet 125 may be coupled to the second guide panel 103. The second guide panel 103 may be formed of a material different from the frame 130. The frame 130 may have a shape surrounding the first and second guide panels 117 and 103. The first or second guide panel 117 or 103 may be referred to as a holder or a support member.

Referring to (c) of FIG. 4, the front cover 105 may not cover the front surface of the display panel 110. That is, one end of the front cover 105 may be positioned on the side surface of the display panel 110.

Figure 5A:
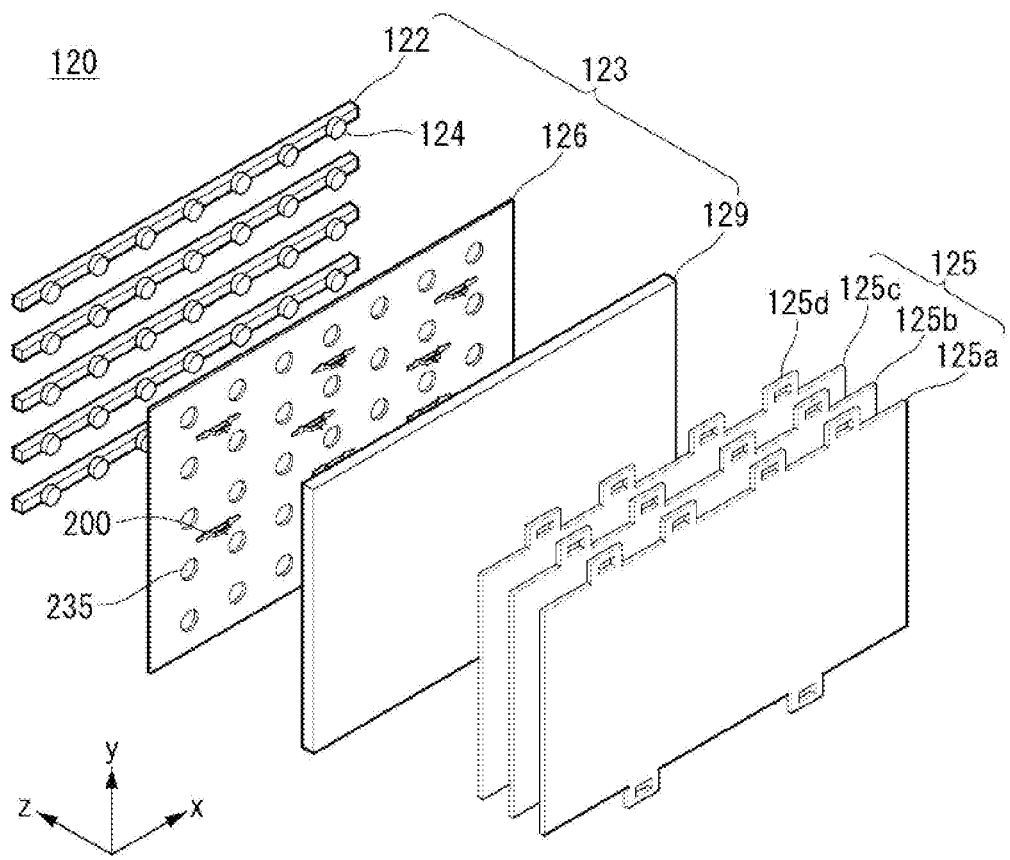

Referring to FIG. 5A, the backlight unit 120 may include an optical layer 123 including a substrate 122, at least one light assembly 124, a reflective sheet 126, and a diffusion plate 129, and an optical sheet 125 positioned at a front of the optical layer 123.

The substrate 122 may be configured in the form of a plurality of straps, which is extended in the first direction and is spaced from one another at predetermined intervals in the second direction perpendicular to the first direction.

At least one light assembly 124 may be mounted on the substrate 122. The substrate 122 may have an electrode pattern for connecting an adaptor to the light assembly 124. For example, a carbon nanotube electrode pattern for connecting the adaptor to the light assembly 124 may be formed on the substrate 122.

The substrate 122 may be formed of at least one of polyethylene terephthalate (PET), glass, polycarbonate (PC), and silicon. The substrate 122 may be a printed circuit board (PCB) on which at least one light assembly 124 is mounted.

The light assemblies 124 may be disposed on the substrate 122 at predetermined intervals in the first direction. A diameter of the light assembly 124 may be greater than a width of the substrate 122. Namely, the diameter of the light assembly 124 may be greater than a length of the substrate 122 in the second direction.

The light assembly 124 may be a light emitting diode (LED) chip or a LED package including at least one LED chip.

The light assembly 124 may consist of a colored LED emitting at least one of red, green, and blue light or a white LED. The colored LED may include at least one of a red LED, a green LED, and a blue LED.

The reflective sheet 126 may be positioned at a front surface of the substrate 122. The reflective sheet 126 may be positioned in an area excluding a formation area of the light assemblies 124 of the substrate 122. The reflective sheet 126 may have a plurality of holes 235.

The reflective sheet 126 may reflect light emitted from the light assembly 124 toward the front. Further, the reflective sheet 126 may again reflect light toward the front that is reflected back from the diffusion plate 129.

The reflective sheet 126 may include at least one of metal and metal oxide, or other reflective material. The reflective sheet 126 may include metal and/or metal oxide, or other reflective material having a high reflectance, for example, at least one of aluminum (Al), silver (Ag), gold (Au), and titanium dioxide ($TiO_2$).

A resin may be deposited on the light assembly 124 and/or the reflective sheet 126. The resin may function to diffuse light emitted from the light assembly 124. The diffusion plate 129 may upwardly diffuse light emitted from the light assembly 124.

The optical sheet 125 may be positioned in front of the diffusion plate 129. A rear surface of the optical sheet 125 may be adhered to the diffusion plate 129, and a front surface of the optical sheet 125 may be adhered to the rear surface of the display panel 110 (see FIG. 1).

The optical sheet 125 may include at least one sheet. More specifically, the optical sheet 125 may include one or more prism sheets and/or one or more diffusion sheets. A plurality of sheets included in the optical sheet 125 may be in an attachment and/or adhesion state.

The optical sheet 125 may consist of a plurality of sheets having different functions. For example, the optical sheet 125 may include first to third optical sheets 125a to 125c. For example, the first optical sheet 125a may be a diffusion sheet, and the second and third optical sheets 125b and 125c may be prism sheets. A combination of the numbers and/or positions of the diffusion sheets and the prism sheets may vary.

The diffusion sheet can prevent light coming from the diffusion plate from being partially concentrated and can further uniformize distribution of light. The prism sheet can concentrate light coming from the diffusion sheet and can provide light to the display panel 110.

A coupling portion 125d may be formed on at least one of sides or edges of the optical sheet 125. The coupling portion 125d may be formed on at least one of the first to third optical sheets 125a to 125c.

The coupling portion 125d may be formed on a long side of the optical sheet 125. The coupling portion 125d on a first long side and the coupling portion 125d on a second long side may be asymmetric. For example, a number and/or a position of the coupling portions 125d on the first long side may be different from a number and/or a position of the coupling portions 125d on the second long side.

Figure 5B:
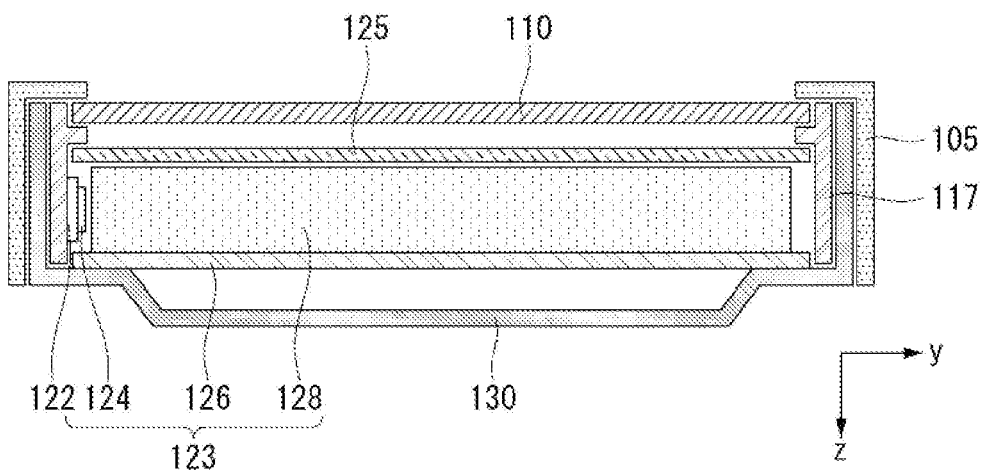

Referring to FIG. 5B, the optical layer 123 may include the substrate 122, the reflective sheet 126, the light assembly 124, and a light guide plate 128. Some of the above components of the optical layer 123 may be omitted.

The optical layer 123 may be positioned in front of the frame 130. The optical layer 123 may be positioned between the frame 130 and the display panel 110. The optical layer 123 may be supported by the frame 130.

The substrate 122 may be positioned inside the frame 130. The substrate 122 may be coupled to the first guide panel 117. The substrate 122 may be directly coupled to the first guide panel 117. For example, the substrate 122 may be coupled to at least one of the first guide panel 117, the frame 130, and the front case 105. The front case 105 may be referred to as a top case 105.

The substrate 122 may be positioned adjacent to the side of the reflective sheet 126 and/or the light guide plate 128. That is, it means that the front surface of the substrate 122 may face toward the optical layer 123. The substrate 122 and the reflective sheet 126 and/or the light guide plate 128 may be spaced apart from each other by a predetermined distance.

Figure 6:
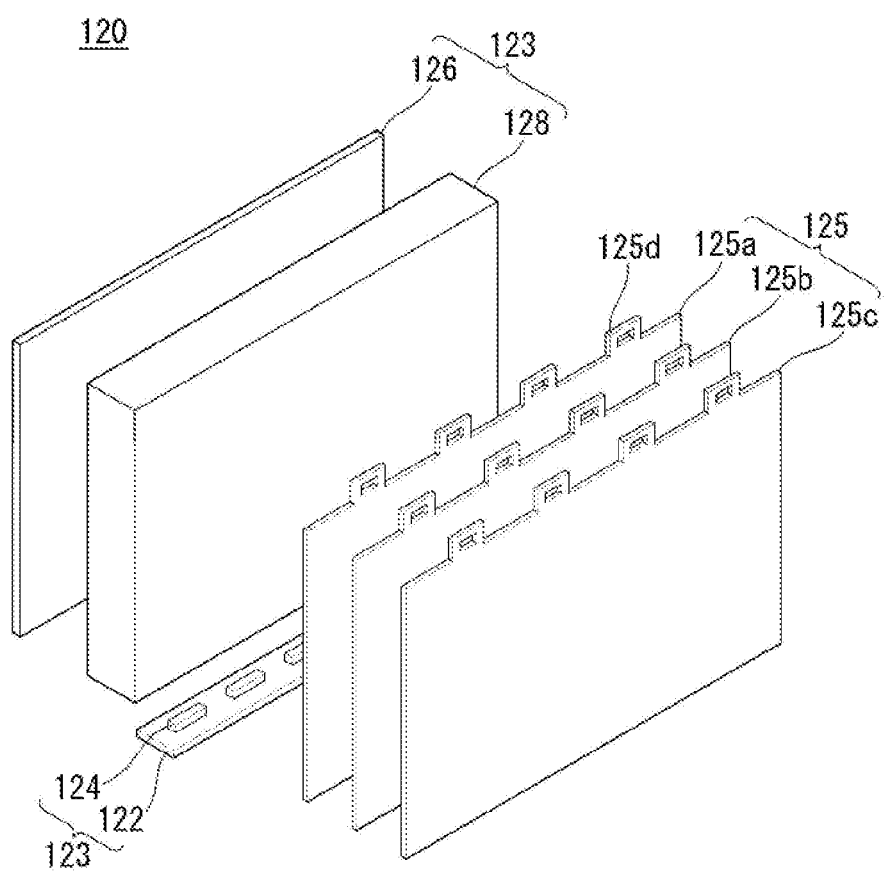

Referring to FIG. 6, the substrate 122 may be positioned on at least one side of another configuration of the optical layer 123. The light assembly 124 or the light assemblies 124 may be mounted on the substrate 122. The substrate 122 may have an electrode pattern for connecting an adaptor to the light assembly 124. For example, a carbon nanotube electrode pattern for connecting the adaptor to the light assembly 124 may be formed on the substrate 122. For example, the substrate 122 may be a printed circuit board (PCB).

The light assemblies 124 may be disposed on the substrate 122 at predetermined intervals. The light assembly 124 may be less than a thickness of the light guide plate 128. Thus, most of light provided by the light assembly 124 may be transferred to the light guide plate 128.

The light assembly 124 may be a light emitting diode (LED) chip or a LED package including at least one LED chip.

The light assembly 124 may consist of a colored LED emitting at least one of red, green, and blue light or a white LED.

A light source included in the light assembly 124 may be a COB (chip-on board) type. The COB light source may be configured such that an LED chip that is the light source is directly coupled to the substrate 122. Thus, a process can be simplified. Further, a resistance can be reduced, and hence a loss of energy resulting from heat can be reduced. That is, power efficiency of the light assembly 124 can increase. The COB light source can provide the brighter lighting and can be implemented to be thinner and lighter than the related art.

The light guide plate 128 may widely spread light incident from the light assembly 124. The reflective sheet 126 may be positioned at a rear of the light guide plate 128. The reflective sheet 126 may reflect light provided by the light assembly 124. The reflective sheet 126 may again reflect light coming from the light guide plate 128 toward the front of the light guide plate 128.

The reflective sheet 126 may include at least one of metal and metal oxide, or other reflective material. The reflective sheet 126 may include metal and/or metal oxide or other material having a high reflectance, for example, at least one of aluminum (Al), silver (Ag), gold (Au), and titanium dioxide ($TiO_2$).

The reflective sheet 126 may be formed by depositing and/or coating metal or metal oxide, or other reflective material. An ink including a metal material may be printed on the reflective sheet 126. A deposition layer may be formed on the reflective sheet 126 using a heat deposition method, an evaporation method, or a vacuum deposition method such as a sputtering method. A coating layer and/or a printing layer may be formed on the reflective sheet 126 using a printing method, a gravure coating method, or a silk screen method.

A diffusion plate (not shown) may be further included on a front surface of the light guide plate 128. The diffusion plate may diffuse light emitted from the light guide plate 128 toward a forward direction.

A resin may be deposited on the light assembly 124 and/or the reflective sheet 126. The resin may diffuse light provided by the light assembly 124.

The optical sheet 125 may be positioned in front of the light guide plate 128. A rear surface of the optical sheet 125 may face the light guide plate 128, and a front surface of the optical sheet 125 may face the rear surface of the display panel 110.

The optical sheet 125 may include at least one sheet. The optical sheet 125 may include one or more prism sheets and/or one or more diffusion sheets. A plurality of sheets included in the optical sheet 125 may be in an attachment and/or adhesion state.

For example, the optical sheet 125 may include first to third optical sheets 125a to 125c. The first optical sheet 125a may be a diffusion sheet, and the second and third optical sheets 125b and 125c may be prism sheets. A number and/or a position of the diffusion sheets and the prism sheets may vary.

The diffusion sheet can prevent light coming from the light guide plate 128 from being partially concentrated and can further uniformize distribution of light. The prism sheet can concentrate light coming from the diffusion sheet and can provide light to the display panel 110.

Figure 7:
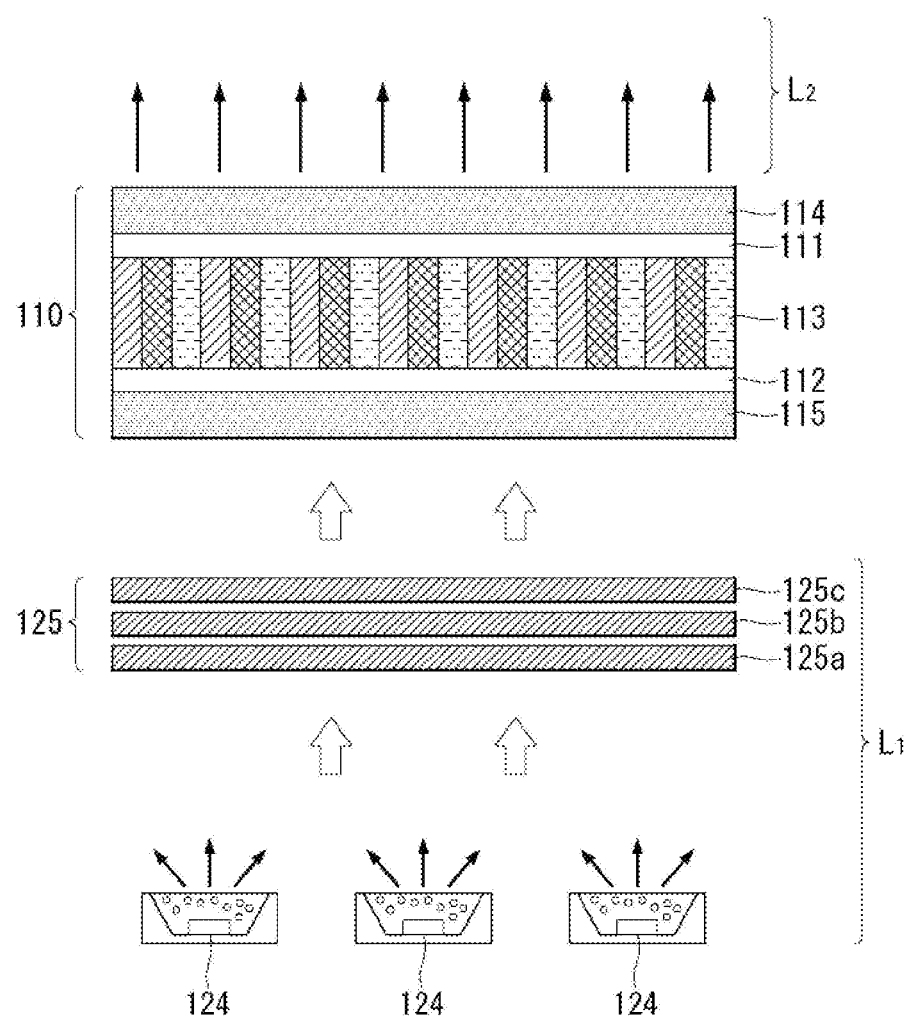
FIGS. 7, 8 and 9 illustrate examples of light and spectrum of the light provided by a display device according to embodiments of the present disclosure.

Referring to FIG. 7, the light assembly 124 may provide light to the optical sheet 125. Light distributed and/or concentrated on the optical sheet 125 may be provided to the display panel 110. The display panel 110 may display an image using the light.

Light provided by the light assembly 124 is referred to as L1 if the light is before passing through the display panel 110, and is referred to as L2 if the light passed through the display panel 110. In this case, light L1 and light L2 may have different spectrums.

Figure 8:
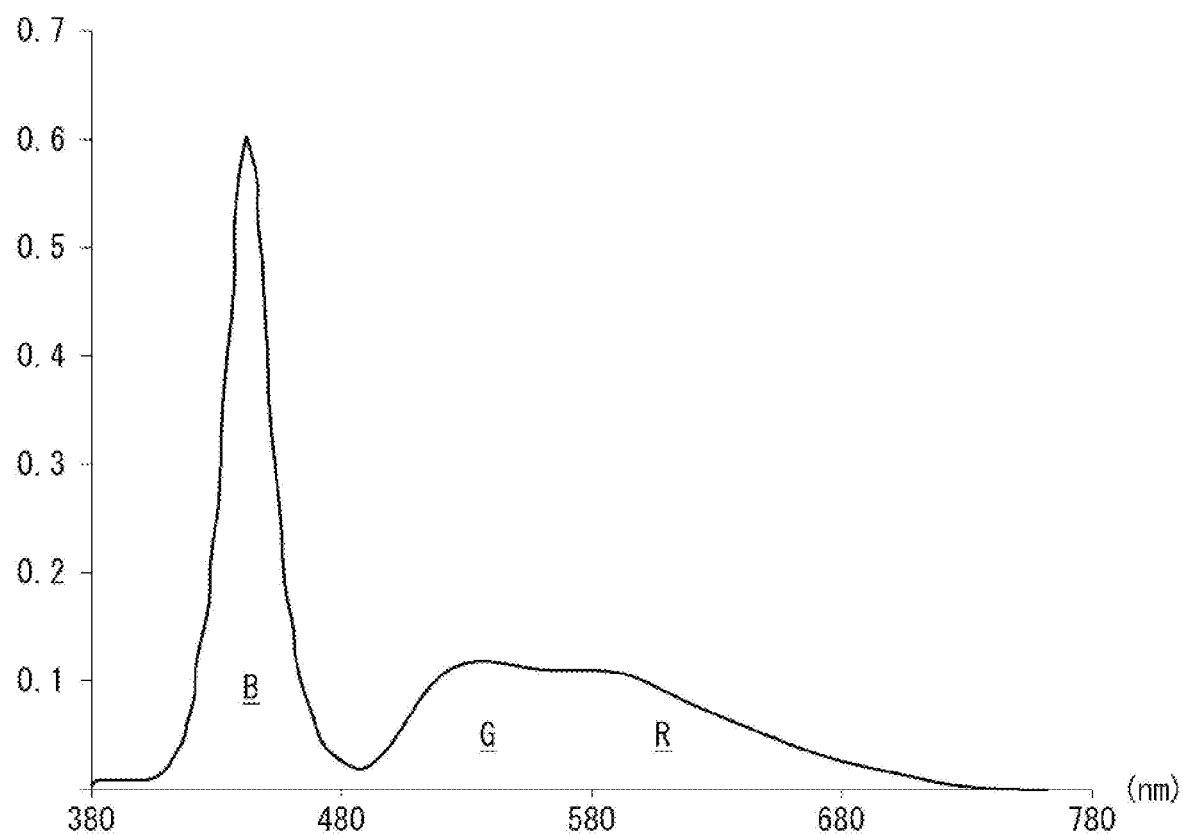

FIG. 8 illustrates an example of a spectrum of light L1. In FIG. 8, the x-axis indicates a wavelength (nm) of light, and y-axis indicates an intensity of light. 'B' may be an intensity or a distribution of blue-based light, 'G' may be an intensity or a distribution of green-based light, and 'It' may be an intensity or a distribution of red-based light.

The light assembly 124 (see FIG. 7) may include an LED as a light source. An LED may emit white light. In this instance, the LED emitting white light may configured by packaging yellow-based or red-based fluorescent substance to a blue LED. The light source with the configuration described above may provide the light L1 with the wavelength and/or the intensity illustrated in FIG. 8.

Figure 9:
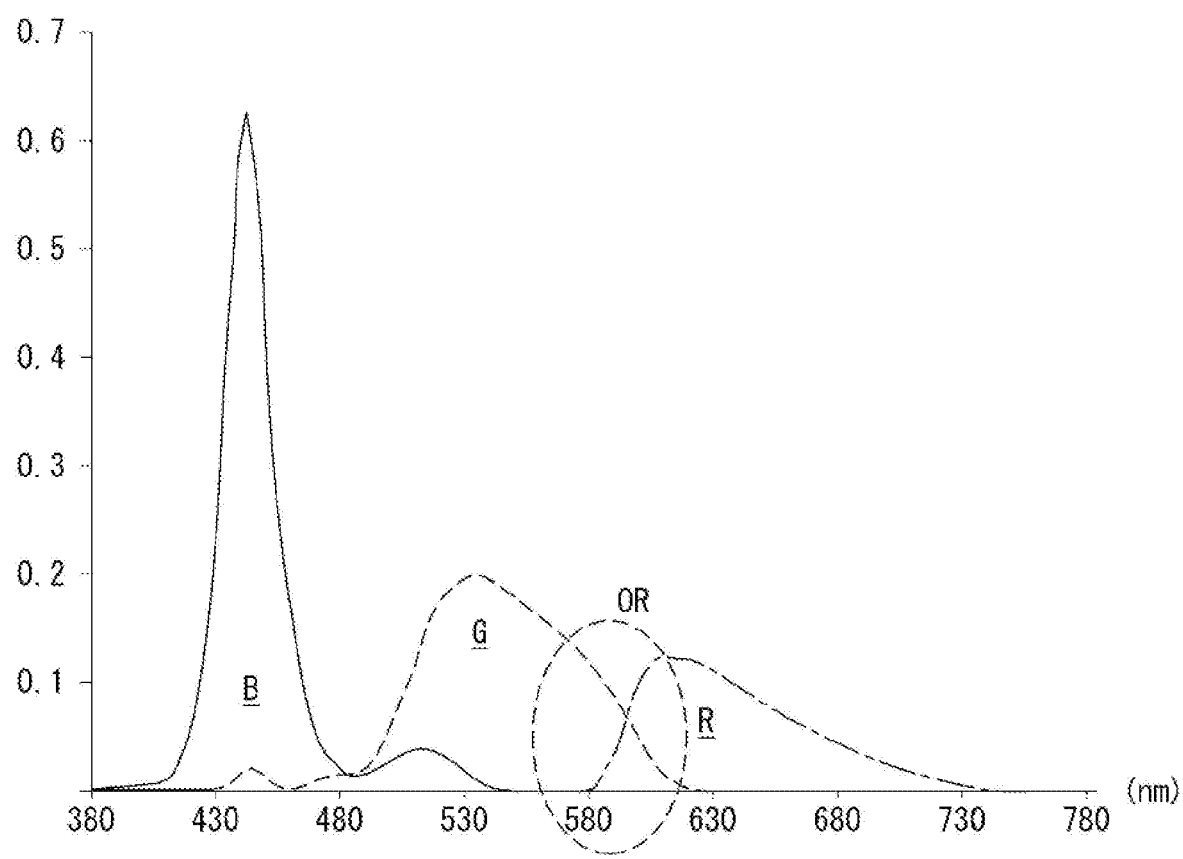

FIG. 9 illustrates an example of a spectrum of light L2. More specifically, FIG. 9 illustrates an example of a spectrum of light provided from the display panel 110 (see FIG. 7), for example, light used to display an image. Referring to FIG. 9, blue-based light B may have high color purity, and on the other hand, green-based light G and red-based light R may have relatively low color purity shown by the overlap area OR between them in FIG. 9. The low color purity indicates that color representation is reduced, leading to a difficulty in implementing good image quality.

Figure 10:
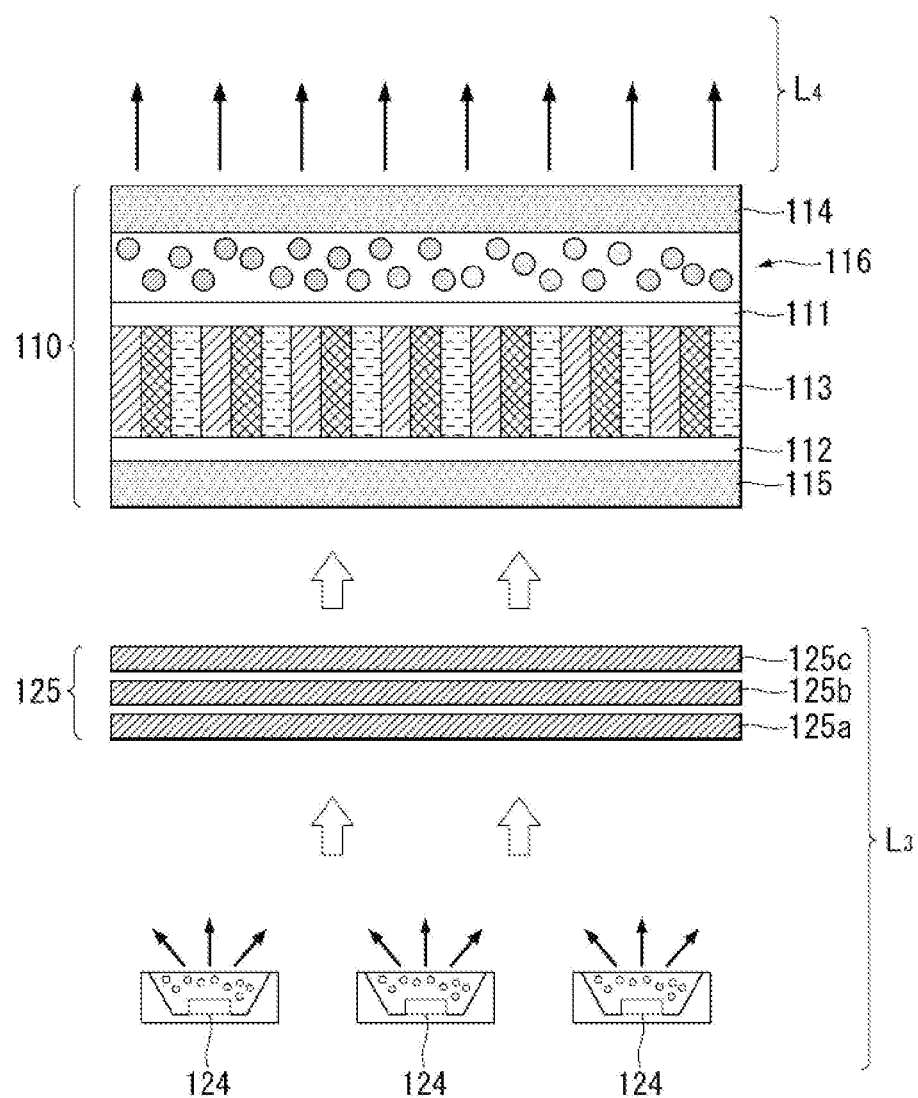
FIGS. 10, 11, 12, 13, and 14 illustrate examples of a light absorbing layer or a light absorbing portion included in a display device according to embodiments of the present disclosure.

Referring to FIG. 10, the light assembly 124 may provide light to the optical sheet 125. Light distributed and/or concentrated to the optical sheet 125 may be provided to the display panel 110. The display panel 110 may display an image using the light.

Light provided by the light assembly 124 is referred to as L3 prior to passing through the display panel 110, and is referred to as L4 after passing through the display panel 110. In this case, light L3 and light L4 may have different spectrums.

A light absorbing portion 116 may be positioned at the front or rear of the display panel 110. The display panel 110 may include a front substrate 111, a rear substrate 112, a color filter 113, and polarizing films 114 and 115. The color filter 113 may be positioned between the front substrate 111 and the rear substrate 112. The first polarizing film 114 may be positioned at a front of the front substrate 111, and the second polarizing film 115 may be positioned at a rear of the rear substrate 112. A liquid crystal layer and a thin film transistor (TFT) may be added between the front substrate 111 and the rear substrate 112, and a description thereof is omitted.

The light absorbing portion 116 may be positioned or formed between the front substrate 111 and the first polarizing film 114. The light absorbing portion 116 may be in the form of a film and may be disposed or attached on the front surface of the front substrate 111. The light absorbing portion 116 may be applied or deposited on the front surface of the front substrate 111 in a liquid state to form a layer.

For example, the light absorbing portion 116 may include a light absorber and an encapsulant. The light absorber is described later. The encapsulant may be an adhesive. The light absorbing portion 116 may be formed by mixing the light absorber with the encapsulant and then applying a mixture to the front substrate 111. The light absorbing portion 116 may be referred to as a light absorbing layer 116.

Figure 11:
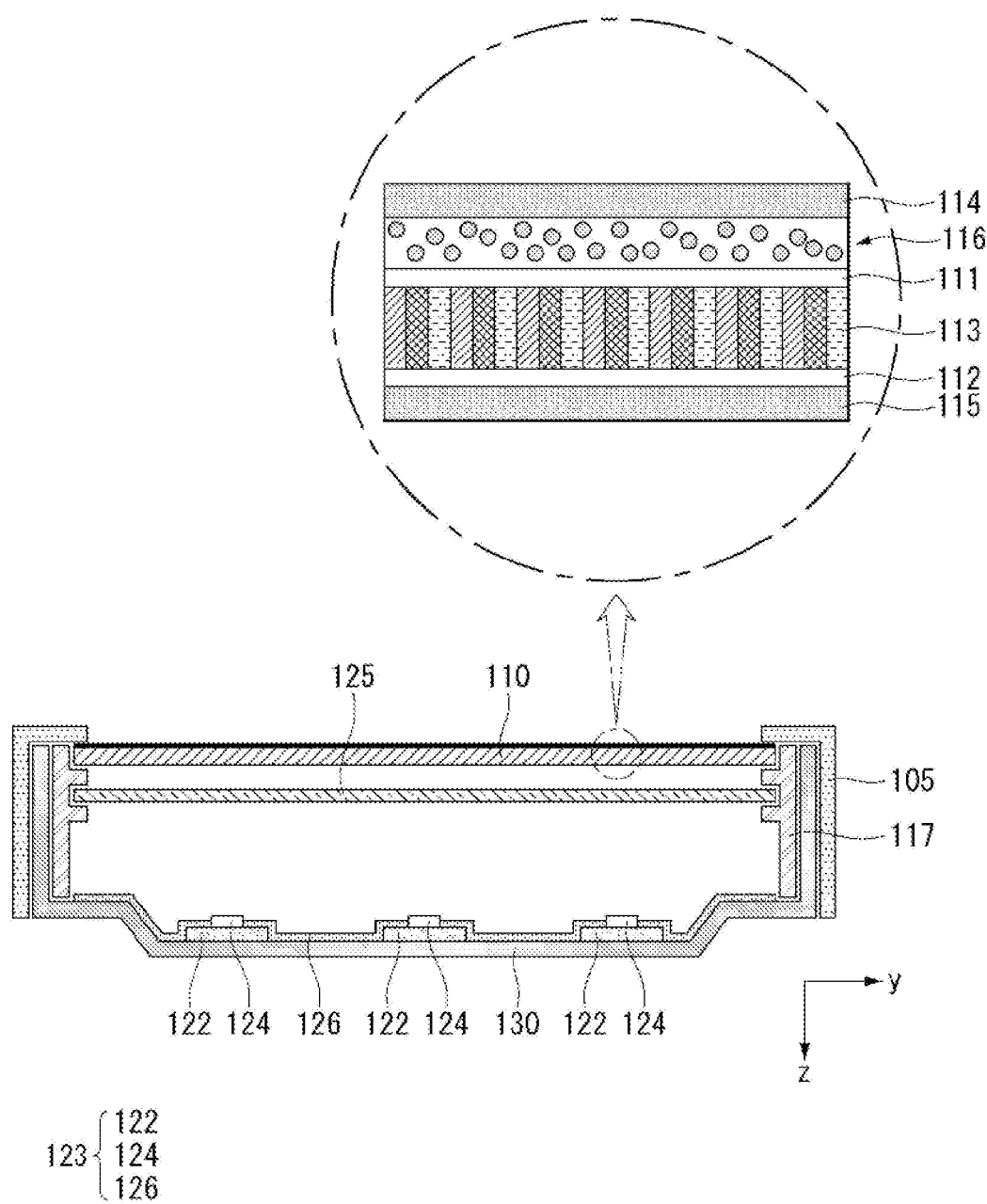

Referring to FIG. 11, the light absorbing layer 116 may be positioned at the front of the display panel 110. The light absorbing layer 116 may be positioned or formed or deposited or attached on the front surface of the front substrate 111.

Figure 12:
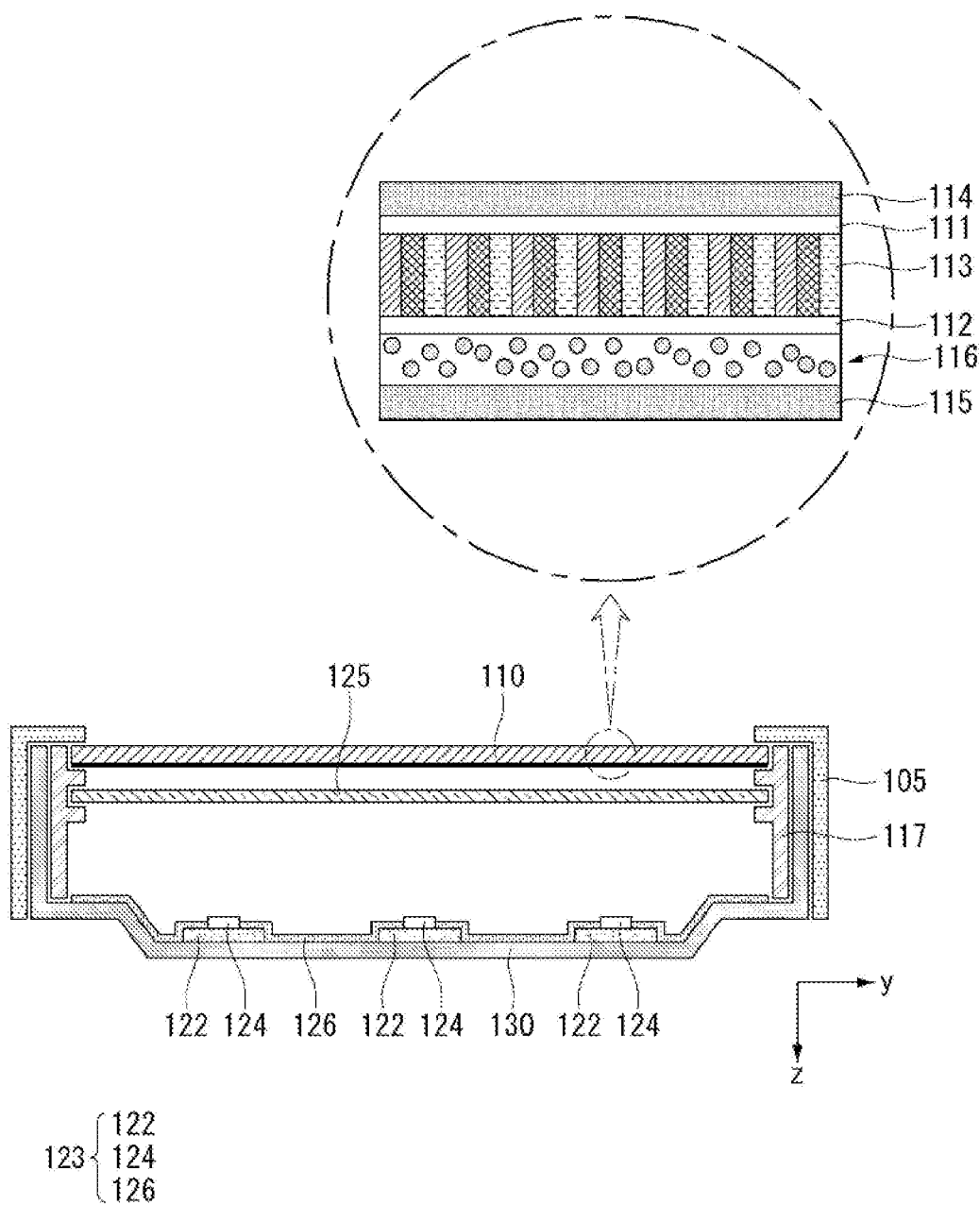

Referring to FIG. 12, the light absorbing layer 116 may be positioned at the rear of the display panel 110. The light absorbing layer 116 may be positioned or formed or deposited or attached on the rear surface of the rear substrate 112.

Figure 13:
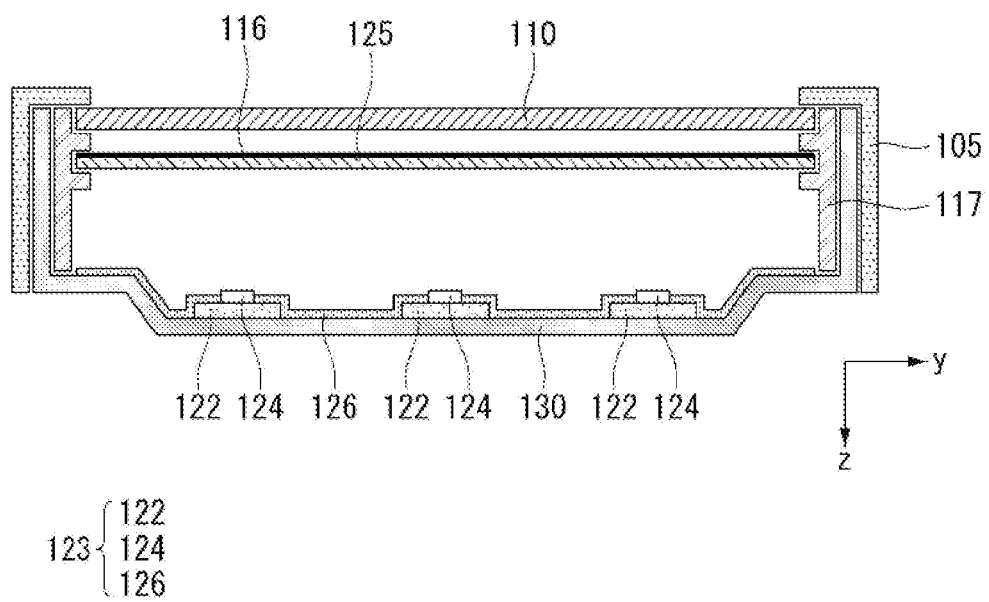

Referring to FIG. 13, the light absorbing layer 116 may be positioned in front of the optical sheet 125 or formed or attached or deposited on the front surface of the optical sheet 125. As another example, the light absorbing layer 116 may be a quantum dot enhancement film (referred to as "QD film"). The QD film may include red and/or green particles of 5 to 6 nanometers.

Figure 14:
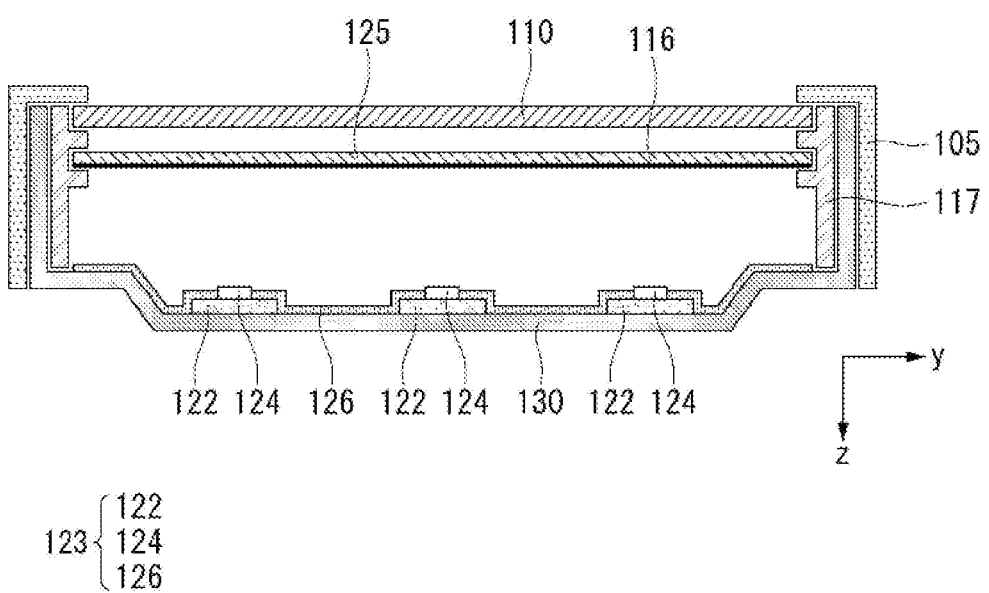

Referring to FIG. 14, the light absorbing layer 116 may be positioned at a rear of the optical sheet 125 or formed or attached or deposited on the rear surface of the optical sheet 125. As another example, the light absorbing layer 116 may be a quantum dot enhancement film (referred to as "QD film"). The QD film may include red and/or green particles of 5 to 6 nanometers.

That is, the light absorbing layer 116 may be on a path of light that is provided by the light assembly 124 and travels toward the display panel 110.

Figure 15:
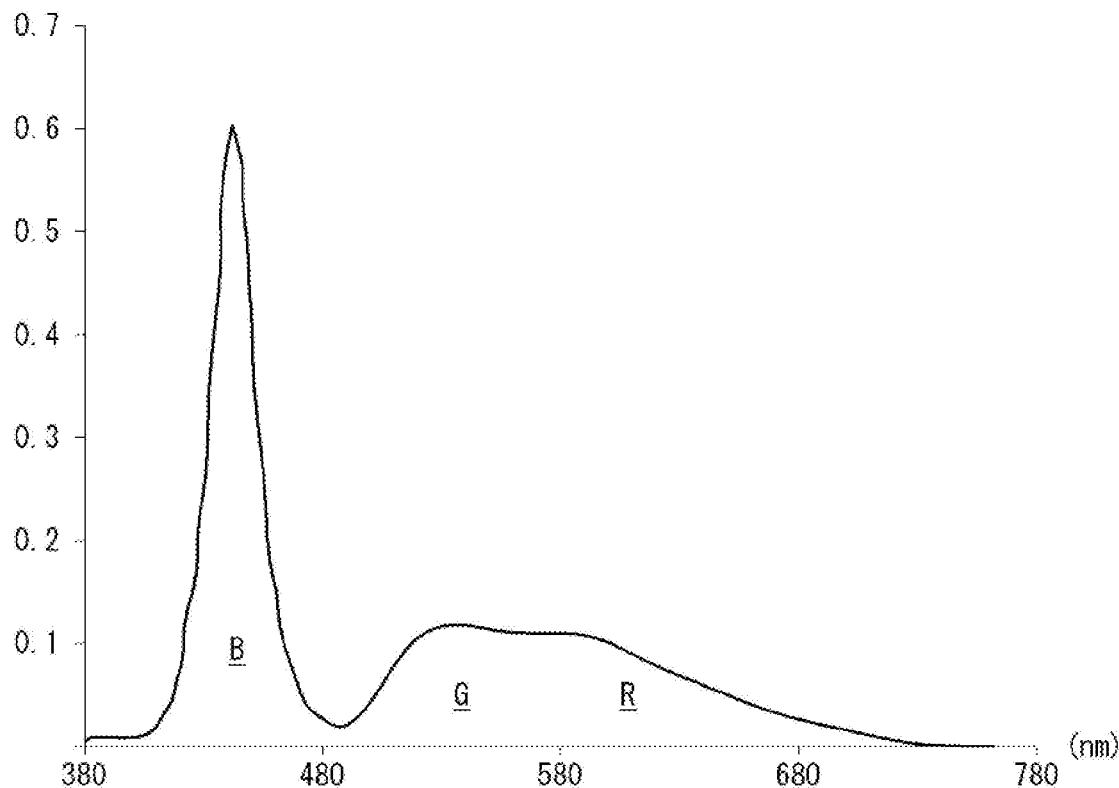
FIG. 15 illustrates an example of a spectrum of light provided by a light source or a backlight unit according to embodiments of the present disclosure.

FIG. 15 illustrates an example of a spectrum of light L3. In FIG. 15, x-axis indicates a wavelength (nm) of light, and y-axis indicates an intensity of light. 'B' may be an intensity or a distribution of blue-based light, 'G' may be an intensity or a distribution of green-based light, and 'R' may be an intensity or a distribution of red-based light.

The light assembly 124 (see FIG. 10) may include an LED as a light source. An LED may emit white light. In this instance, the LED emitting white light may configured by packaging yellow-based or red-based fluorescent substance to a blue LED. The light source with the configuration described above may provide the light L3 with the wavelength and/or the intensity illustrated in FIG. 15.

Figure 16:
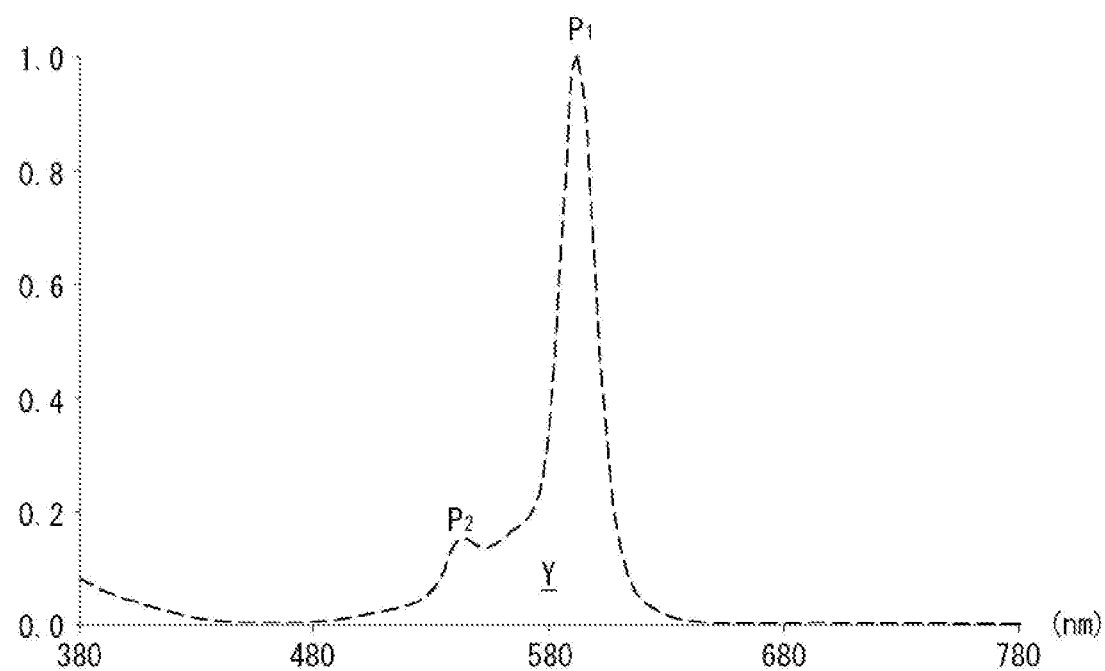
FIG. 16 illustrates an example of a light absorbing spectrum of a light absorbing layer or a light absorbing portion according to embodiments of the present disclosure.

Referring to FIG. 16, the light absorbing portion 116 (see FIG. 10) may include a light absorber or a light absorbing material. For example, the light absorber or the light absorbing material may be tetra-aza-porphyrin. See the following Formula 1.

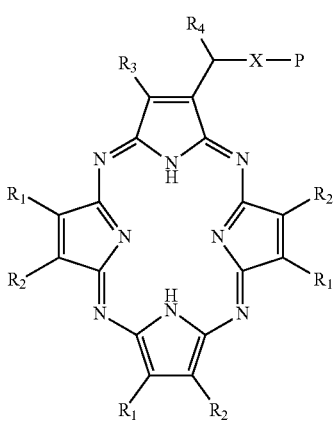

[Formula 1]

Referring to FIG. 16, the light absorbing portion 116 (see FIG. 10) may absorb light of a predetermined wavelength band, and may absorb yellow-based light. For example, the light absorbing portion 116 may absorb light of a wavelength band between 540 nm and 600 nm. A first peak value may be, for example, a wavelength region of 592 nm. A second peak value may be, for example, a wavelength region of 543 nm. Light energy absorbed by the light absorbing portion 116 may be exhausted by the rotation or vibration of electrons.

Figure 17:
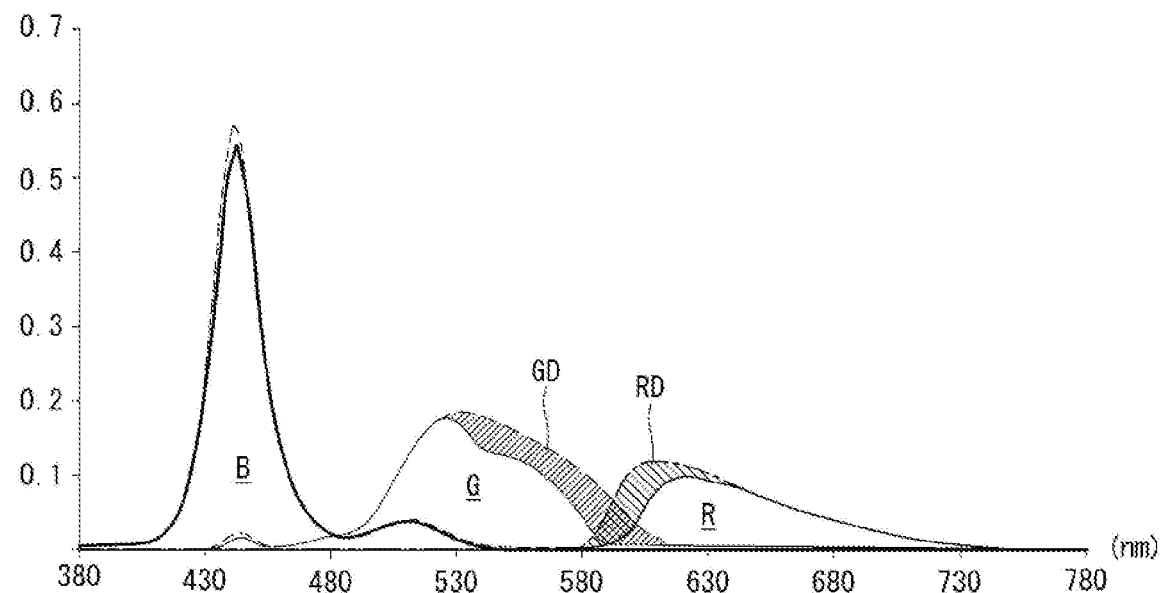
FIG. 17 illustrates an example of a spectrum of light provided by a display device according to embodiments of the present disclosure.

With reference to FIG. 17, a spectrum of light observed at the front of the display panel 110 (see FIG. 10) is illustrated. The light is filtered or absorbed by the light absorbing portion 116 (see FIG. 10), and hence green-based light and red-based light in the light are further distinguished from each other (as indicated by dotted or dashed line). Thus, as can be seen from FIG. 17, color purity or color reproducibility may be improved. However, this may result in a relative increase of an intensity of the blue-based light as compared to an intensity of the green-based light and/or the red-based light. As a result, this may lead to an increase in a color temperature of an image provided on the display panel 110.

Figure 18:
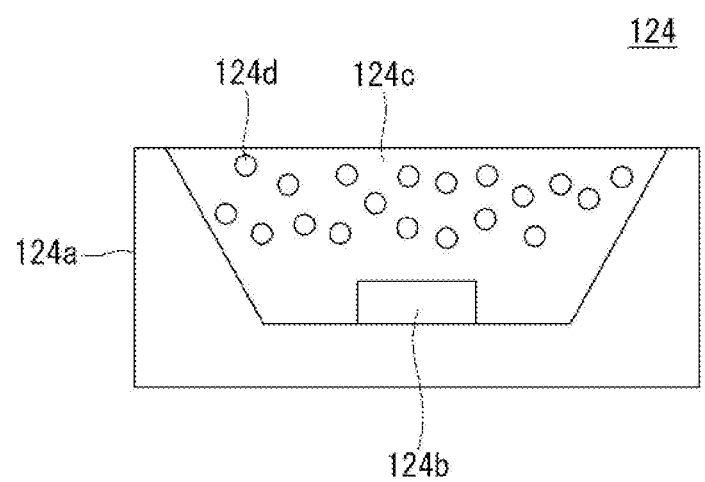
FIGS. 18, 19, 20, 21, and 22 illustrate an example of a light assembly and examples of a spectrum of light provided by a light assembly or a backlight unit according to embodiments of the present disclosure.

Referring to FIG. 18, the light assembly 124 may include a housing 124a, a light source 124b, an encapsulant 124c, and fluorescent substances 124d. The housing 124a may provide an accommodation space, and the accommodation space may be formed to be recessed concavely. The light source 124b may be mounted in the accommodation space of the housing 124a. For example, the light source 124b may be a blue LED. The encapsulant 124c may include the fluorescent substances 124d. The encapsulant 124c may fill the accommodation space of the housing 124a in a liquid state in which the fluorescent substances 124d are mixed, and then may be hardened. Thus, the fluorescent substances 124d may be distributed over the light source 124b. The fluorescent substances 124d may be in the form of a powder. The fluorescent substances 124d may be yellow-based or red-based fluorescent substances.

In an embodiment, a mix percentage of the yellow-based fluorescent substance 124d may be, for example, 42 to 62%, and a mix percentage of the red-based fluorescent substance 124d may be, for example, 37 to 57%. The fluorescent substances 124d may be added and mixed at 100% within the above percentage range.

In an embodiment, if a content of the yellow-based fluorescent substance 124d is represented by, for example, 1, a content ratio of the red-based fluorescent substance 124d with respect to the yellow-based fluorescent substance 124d may be 0.71:1 to 0.93:1.

in an embodiment, a content percentage of the fluorescent substances 124d with respect to the encapsulant 124c may be, for example, 4.2 to 6.8%.

Figure 19:
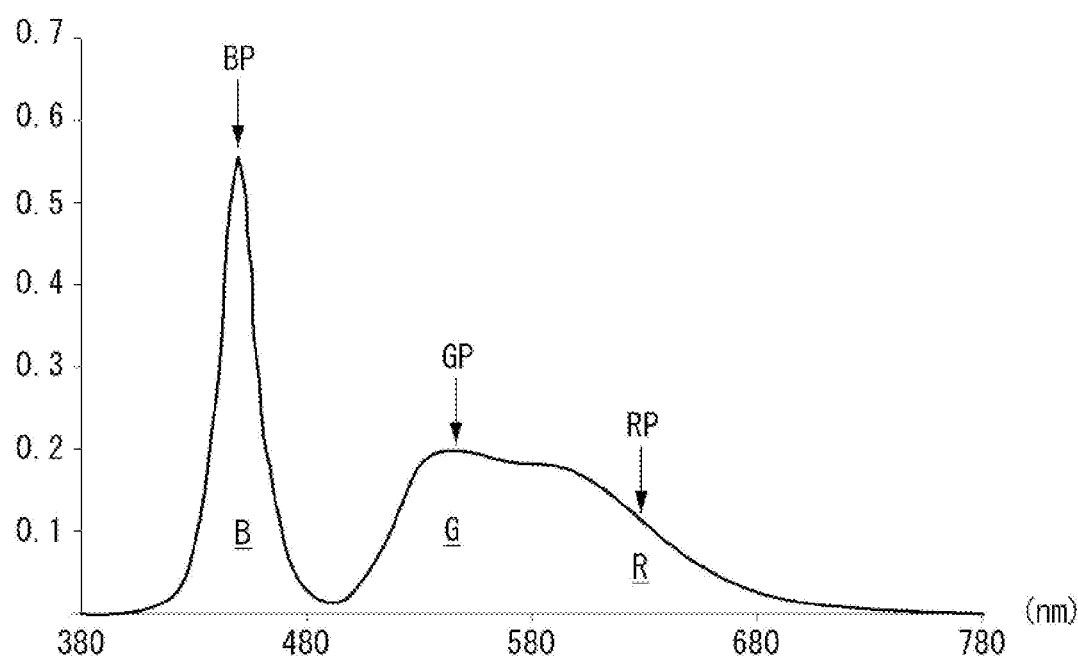

Referring to an embodiment shown in FIG. 19, with respect to an intensity BP (100%) of blue-based light B, an intensity GP of green-based light G may be 36% with respect to the intensity BP, and an intensity RP of red-based light R may be 25% with respect to the intensity BP. These may be a percentage of peak values.

Figure 20:
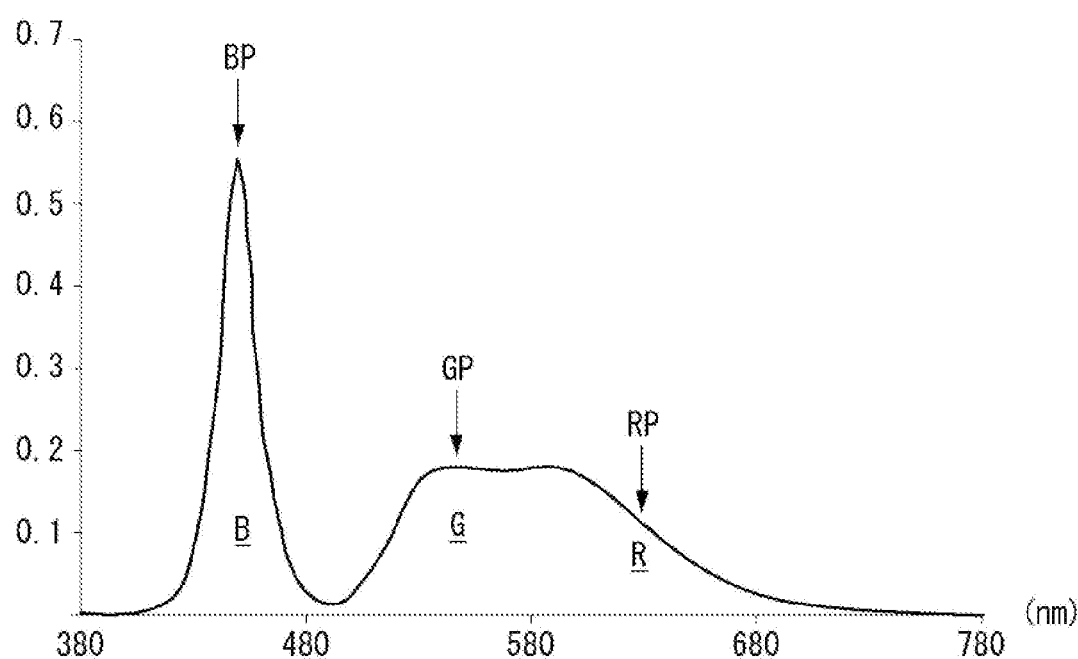

Referring to an embodiment shown in FIG. 20, based on an intensity BP (100%) of blue-based light B, an intensity GP of green-based light G may be 33% with respect to the intensity BP, and an intensity RP of red-based light R may be 26%. These may be a percentage of peak values.

Figure 21:
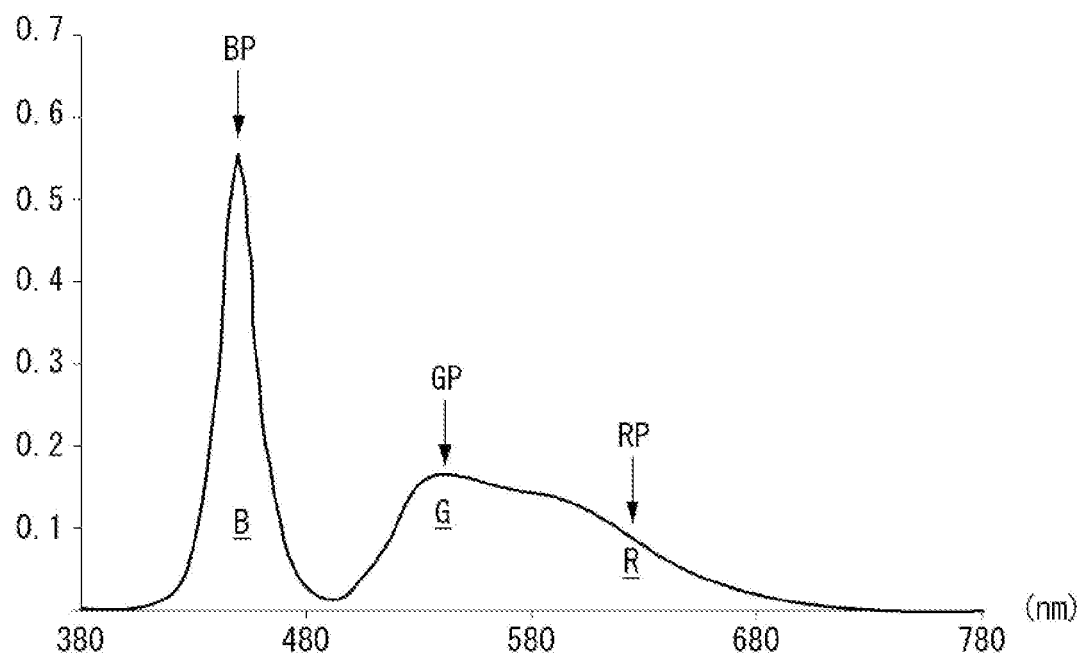

Referring to an embodiment shown in FIG. 21, based on an intensity BP (100%) of blue-based light B, an intensity GP of green-based light G may be 30% with respect to the intensity BP, and an intensity RP of red-based light R may be 19% with respect to the intensity BP. These may be a percentage of peak values.

Figure 22:
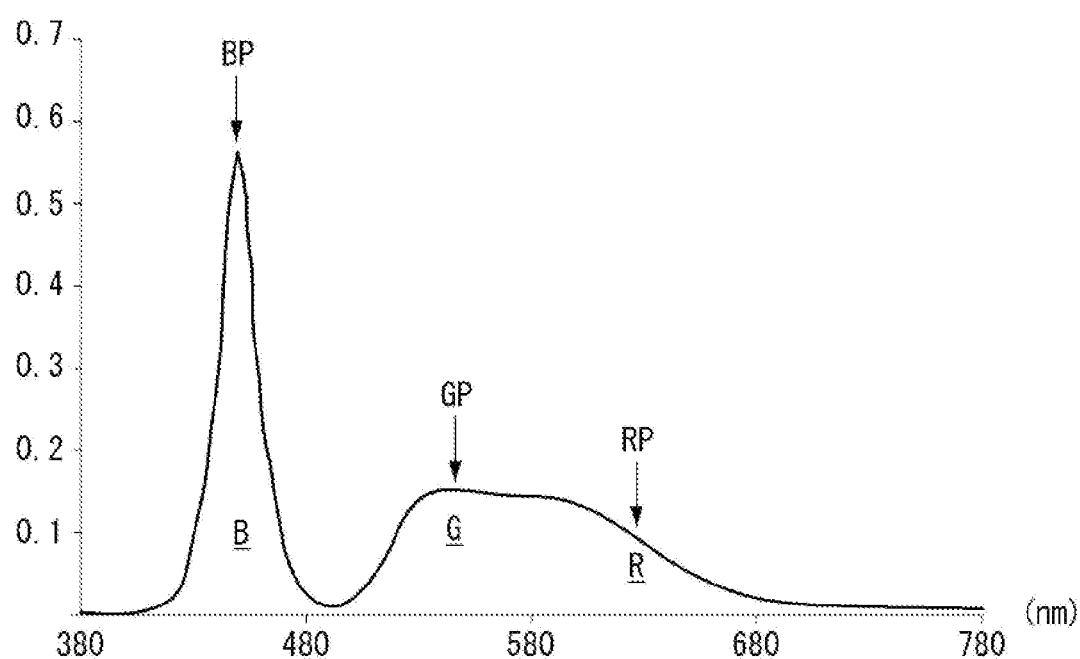

Referring to an embodiment shown in FIG. 22, based on an intensity BP (100%) of blue-based light B, an intensity GP of green-based light G may be 28% with respect to the intensity BP, and an intensity RP of red-based light R may be 20% with respect to the intensity BP. These may be a percentage of peak values.

Figure 23:
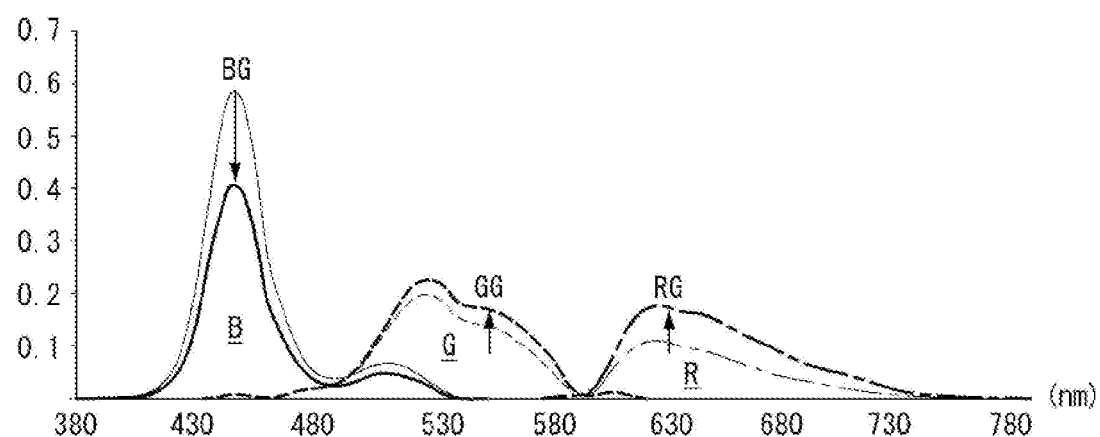
FIG. 23 illustrates an example of a spectrum of light provided by a display device according to embodiments of the present disclosure.

A spectrum of light illustrated in the embodiment shown in FIG. 23 is a spectrum of light provided on the screen of the display device and corresponds to an example of a spectrum of light resulting in the image quality of the display device.

An intensity of blue-based light B was reduced by a predetermined amount BG, an intensity of green-based light G was increased by a predetermined amount GG, and an intensity of red-based light R was increased by a predetermined amount RG.

The blue-based light B has high color purity, and also the green-based light G and the red-based light R have high color purity. The high color purity may indicate that color representation is improved, and intensities of light with each color may be equally adjusted. Hence, good image quality may be achieved.

In other words, since the blue-based light B, the green-based light G, and the red-based light R are dividedly distributed, color reproducibility is at a good state. This is because the display device 100 (see FIG. 1) displays light of various colors by combinations of blue (B) light, green (G) light, and red (R) light. Further, since light provided by the display device 100 is not biased to any one-based color, good color reproducibility (representable at an appropriate color temperature) may be achieved.

Figure 24:
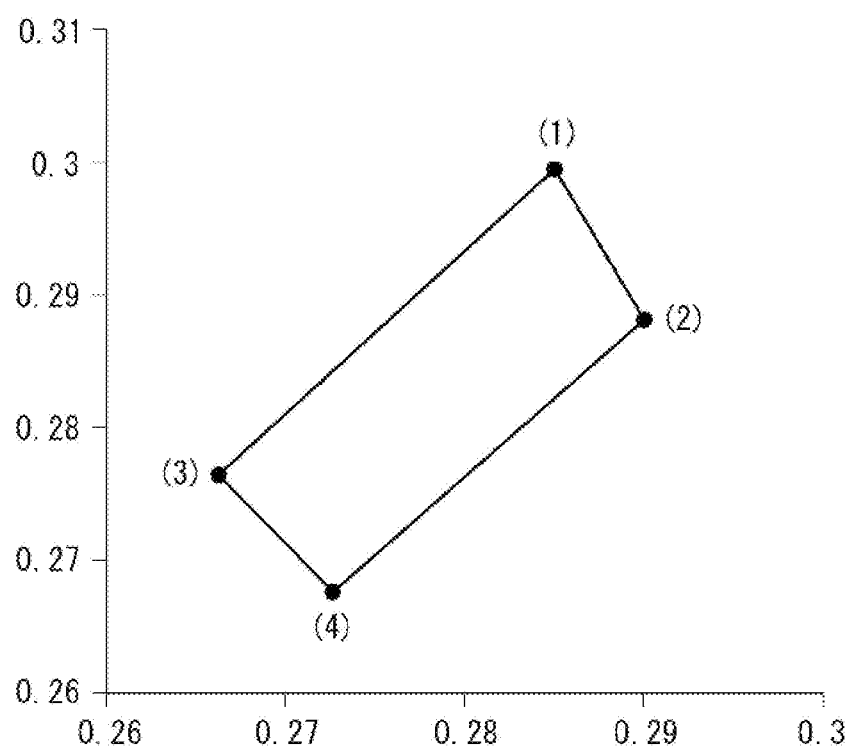
FIG. 24 illustrates an example of color coordinates of light provided by a display device according to embodiments of the present disclosure.

Referring to FIG. 24, a first color coordinate (1) indicates color coordinates (0.2853, 0.2994) of an image (e.g., light L4 of FIG. 10) provided by the display device based on a spectrum of light described with reference to FIG. 19; a second color coordinate (2) indicates color coordinates (0.2901, 0.2881) of an image provided by the display device based on a spectrum of light described with reference to FIG. 20; a third color coordinate (3) indicates color coordinates (0.2664, 0.2765) of an image provided by the display device based on a spectrum of light described with reference to FIG. 21; and a fourth third color coordinate (3) indicates color coordinates (0.2728, 0.2677) of an image provided by the display device based on a spectrum of light described with reference to FIG. 22. These color coordinates indicate that the display device displays an image with high or good quality.

Figure 25:
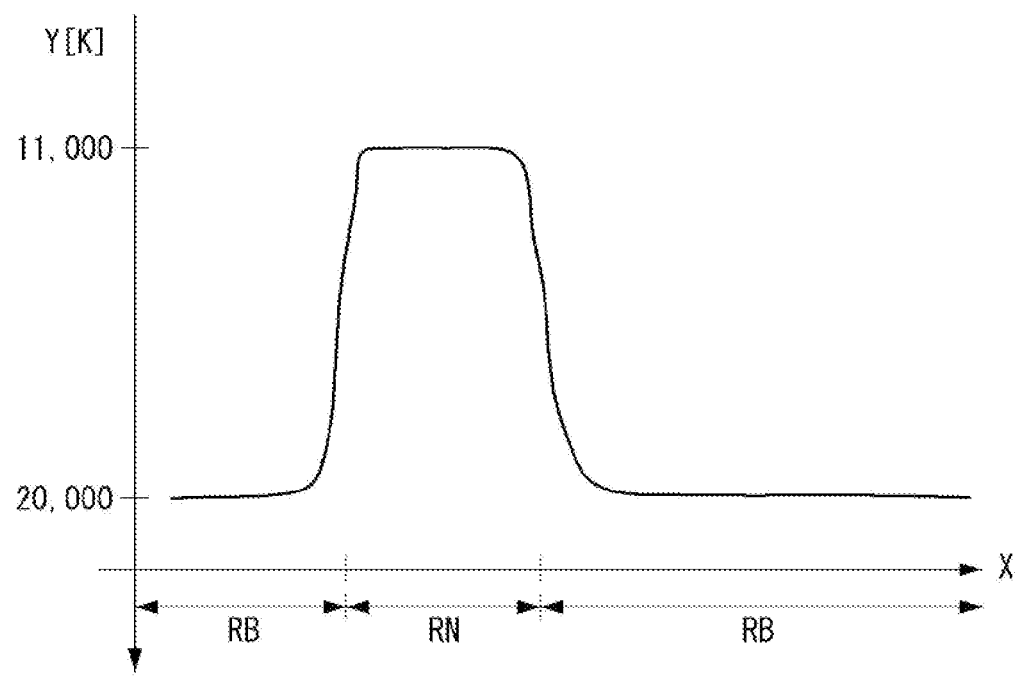
FIG. 25 illustrates an example of a color temperature of light provided by a display device according to embodiments of the present disclosure.

FIG. 25 illustrates an example of a color temperature of light (or an image, e.g., light L4 of FIG. 10) provided by a display device according to embodiments of the present disclosure. In FIG. 25, the X-axis indicates changes in a mix ratio (or content ratio) of fluorescent substances, and the Y-axis indicates a color temperature. Further, 'RN' indicates a range of a mix ratio (or content ratio) of fluorescent substances determined by the above-described embodiments, and 'RB' indicates other ranges.

A color temperature corresponding to RN of an image (e.g., light L4 of FIG. 10) that the display device displays by light provided by the light assembly described with reference to FIGS. 19 to 22 may correspond to about 11,000 K as shown in FIG. 25. A color temperature corresponding to RB of an image that the display device displays by light provided by a related art light assembly may correspond to about 20,000 K as shown in FIG. 25.

Figure 26:
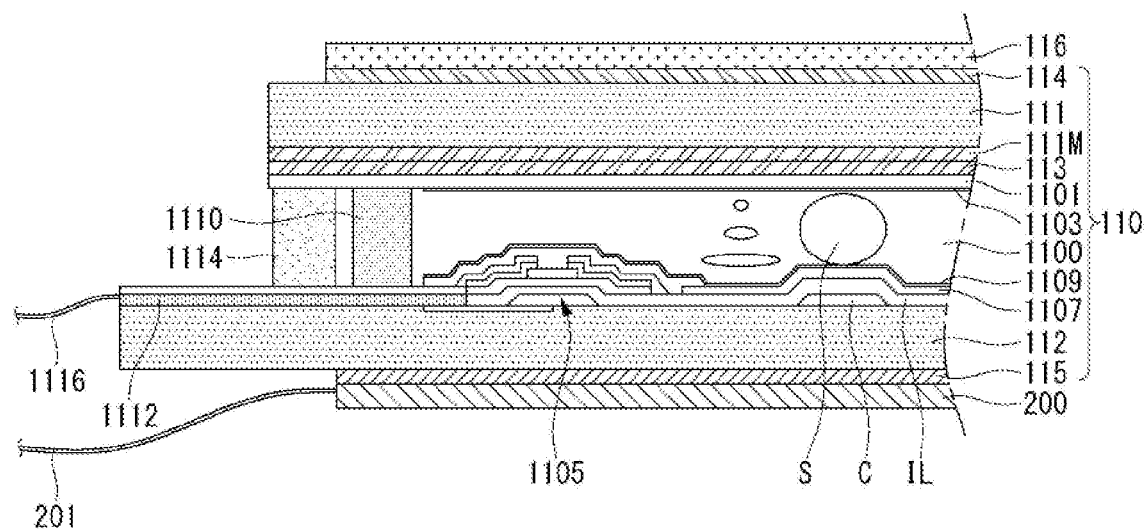
FIG. 26 illustrates an example of a display panel according to embodiments of the present disclosure.

Referring to the embodiment shown in FIG. 26, the display panel 110 may include the front substrate 111, the rear substrate 112, and a liquid crystal layer 1100.

The front substrate 111 may be positioned opposite the rear substrate 112. The liquid crystal layer 1100 may be positioned between the front substrate 111 and the rear substrate 112. The color filter 113 may be positioned between the liquid crystal layer 1100 and the front substrate 111. For example, the color filter 113 may be a resin film having red, green, and blue dyes.

A matrix layer 111M may be disposed on the rear surface of the front substrate 111. The matrix layer 111M may include, for example, black portions or areas. The matrix layer 111M may be between pixels of the color filter 113 and may block light.

A common electrode 1101 may be disposed on a rear surface of the color filter 113. The common electrode 1101 may be a transparent electrical conductor, for example, indium tin oxide (ITO). The common electrode 1101 may apply a voltage to the liquid crystal layer 1100.

A front polarizing layer 114 may be disposed on the front surface of the front substrate 111. The front polarizing layer 114 may selectively transmit only a vibration component of a particular direction of light.

A light absorbing portion 116 may be formed on a front surface of the front polarizing layer 114. A position of the light absorbing portion 116 may be changed as discussed in the embodiments described above.

A front alignment layer 1103 may be disposed on a rear surface of the common electrode 1101. The front alignment layer 1103 is, for example, a thin organic layer formed of polyimide and may arrange liquid crystals in a predetermined direction.

A thin film transistor (TFT) 1105 may be positioned on the front surface of the rear substrate 112. The TFT 1105 may be a switching element that transfers an electrical signal to the liquid crystal layer 1100 or blocks the electrical signal.

A pixel electrode 1107 may be electrically connected to the TFT 1105 and positioned on the front surface of the rear substrate 112. The pixel electrode 1107 is an electrode made of ITO which is a transparent electrical conductor, and may apply the voltage to the liquid crystal layer 1100 in response to the electrical signal transferred from the TFT 1105. An insulating layer IL may be formed between the pixel electrode 1107 and the rear substrate 112.

A capacitor C may be formed between the pixel electrode 1107 and the rear substrate 112. The capacitor C may hold the voltage applied to the liquid crystal layer 1100 for a predetermined period of time by the common electrode 1101 and the pixel electrode 1107.

A rear alignment layer 1109 may be positioned on a front surface of the pixel electrode 1107. The rear alignment layer 1109 is a thin organic layer formed of polyimide and may arrange the liquid crystal layer 1100 in a predetermined direction.

A sealant 1110 may be positioned between the front substrate 111 and the rear substrate 112 and at an outer edge of the display panel 110. The sealant 1110 may seal the liquid crystal layer 1100 and may fix the front substrate 111 to the rear substrate 112.

A connection pad 1112 may be positioned adjacent to one end of the rear substrate 112 and on the front surface of the rear substrate 112. The connection pad 1112 may be electrically connected to the TFT 1105. The connection pad 1112 may transfer a signal of a driving circuit to the TFT 1105.

A short member 1114 may be positioned between the front substrate 111 and the rear substrate 112 and apply the voltage to the common electrode 1101.

A spacer S may be positioned between the front alignment layer 1103 and the rear alignment layer 1109 and maintain an interval between the front substrate 111 and the rear substrate 112.

A rear polarizing layer 115 may be disposed on the rear surface of the rear substrate 112. The rear polarizing layer 115 may selectively transmit only a vibration component of a particular direction of light.

A light shielding layer 200 may be positioned on a rear surface of the rear polarizing layer 115 and may selectively block light that travels from the rear to the front of the display panel 110. The light shielding layer 200 may be attached or combined to the rear polarizing layer 115.

A first line 1116 may be electrically connected to the connection pad 1112. The first line 1116 may be, for example, a flexible printed circuit board (FPCB) or a chip on film (COF). A second line 201 may be electrically connected to the light shielding layer 200. The second line 201 may be, for example, a FPCB or a COF. The first line 1116 may be referred to as a first wire 1116, and the second line 201 may be referred to as a second wire 201.

Figure 27:
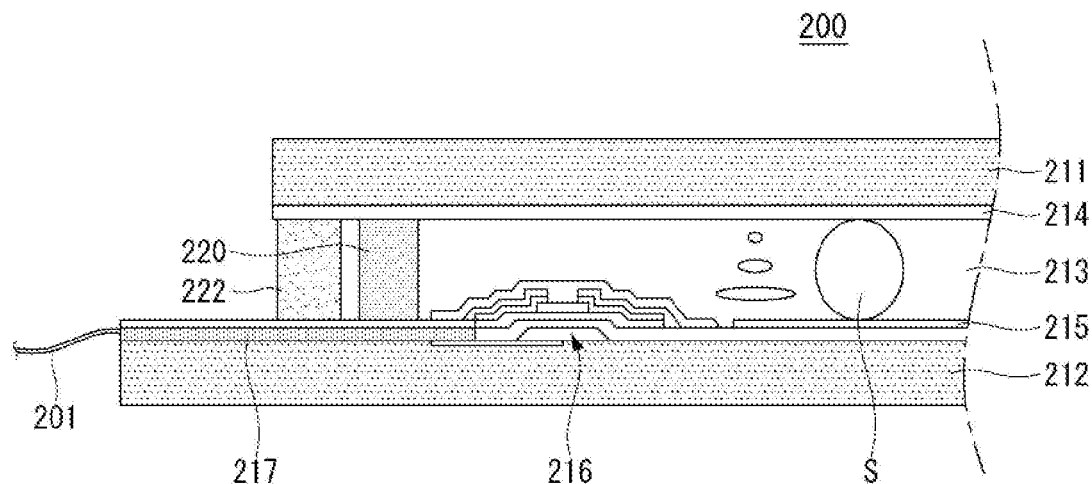
FIG. 27 illustrates an example of a light shielding layer according to embodiments of the present disclosure.

Referring to FIG. 27, the light shielding layer 200 may include a front film 211, a rear film 212, and a liquid crystal layer 213. The front film 211 may be positioned opposite the rear film 212. The liquid crystal layer 213 may be positioned between the front film 211 and the rear film 212. The front film 211 may be referred to as a front layer 211 or a front substrate 211. The rear film 212 may be referred to as a rear layer 212 or a rear substrate 212.

A common electrode 214 may be disposed on a rear surface of the front film 211. The common electrode 214 may be a transparent electrical conductor, for example, indium tin oxide (ITO). The common electrode 214 may apply a voltage to the liquid crystal layer 213.

A TFT 216 may be positioned on a front surface of the rear film 212. The TFT 216 may be a switching element that transfers an electrical signal to the liquid crystal layer 213 or blocks the electrical signal.

A pixel electrode 215 may be electrically connected to the TFT 216 and positioned on the front surface of the rear film 212. The pixel electrode 215 is an electrode made of ITO which is a transparent electrical conductor, and may apply the voltage to the liquid crystal layer 213 in response to the electrical signal transferred from the TFT 216.

A sealant 220 may be positioned between the front film 211 and the rear film 212 and at an outer edge of the display panel 110. The sealant 220 may seal the liquid crystal layer 213 and may fix the front film 211 to the rear film 212.

A connection pad 217 may be positioned adjacent to one end of the rear film 212 and on the front surface of the rear film 212. The connection pad 217 may be electrically connected to the TFT 216. The connection pad 217 may transfer a signal of a driving circuit to the TFT 216.

A short member 222 may be positioned between the front film 211 and the rear film 212 and apply the voltage to the common electrode 214.

A spacer S may be positioned between the front film 211 and the rear film 212 and maintain an interval between the front film 211 and the rear film 212.

The second line 201 may be electrically connected to the connection pad 217.

The components of the display panel 110 described with reference to FIG. 26 may be combined with or replaced by the components of the light shielding layer 200 described with reference to FIG. 27. That is, the light shielding layer 200 may further include the components of the display panel 110 described with reference to FIG. 26.

Figure 28:
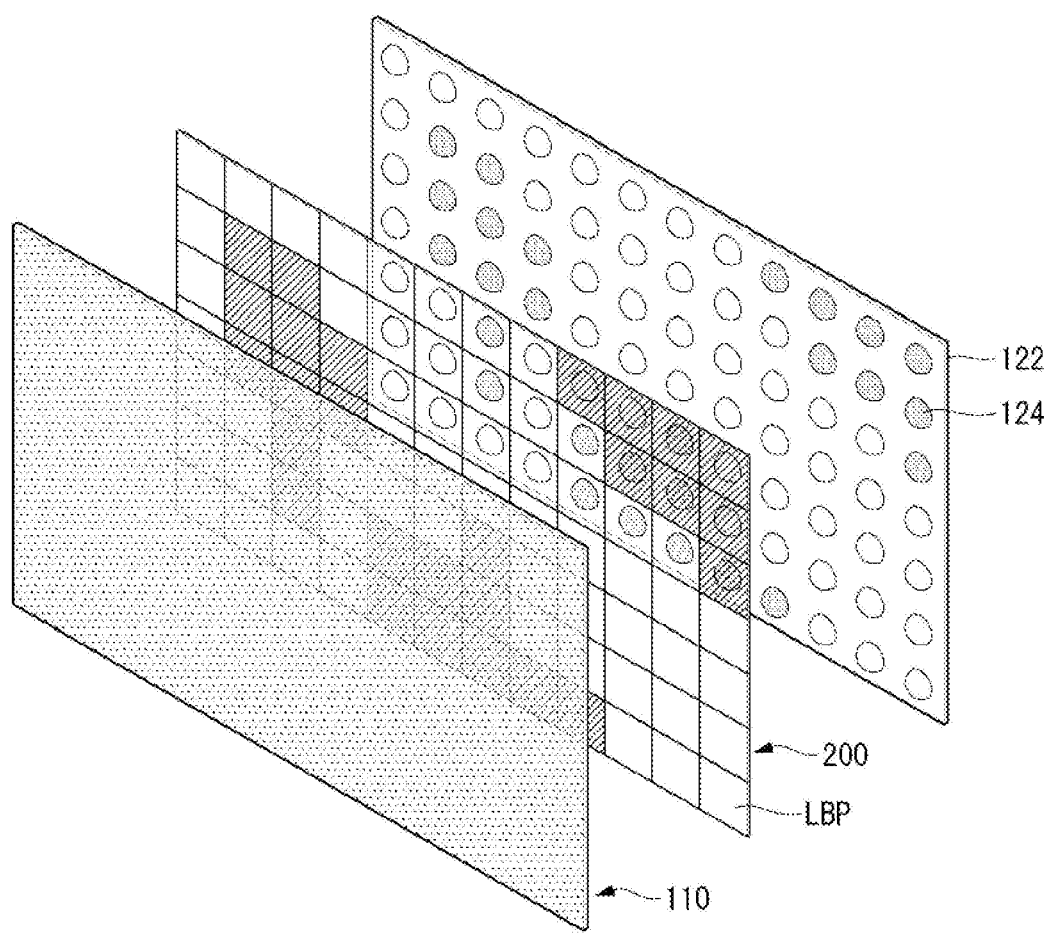
FIGS. 28, 29, and 30 illustrate examples of local diming configuration according to embodiments of the present disclosure.

Referring to the embodiment of FIG. 28, the light shielding layer 200 may be positioned between the display panel 110 and light assemblies 124. The light shielding layer 200 may block or pass light that the light assemblies 124 provide to the display panel 110. A number of light shielding pixels LBP of the light shielding layer 200 blocking light may correspond to the number of light assemblies 124. A matrix of the light shielding pixels LBP may correspond to a matrix of the plurality of light assemblies 124.

For example, when the matrix of the light shielding pixels LBP is 7×12, the matrix of the plurality of light assemblies 124 may be 7×12. Hence, the light shielding layer 200 corresponds to each of the plurality of light assemblies 124 and can implement local diming. If the matrix of the light shielding pixels LBP corresponds to the matrix of the plurality of light assemblies 124, driving power required for the TFT 216 (see FIG. 27) can decrease.

For example, when power is provided to some of the light assemblies 124 and is blocked from being provided to some of the light assemblies 124, the light shielding pixels LBP corresponding to the light assemblies 124 receiving the power through the light shielding layer 200 can pass light, and the light shielding pixels LBP corresponding to the light assemblies 124 not receiving the power can block light. Hence, characteristics of the black levels provided by the display panel 110 can be further improved and color reproducibility or color representation of the display panel 110 can be further improved.

Where black levels implemented by the display panel 110 are not displayed as pure black and is instead displayed closer to gray due to an amount of light reflected from the display panel 110, the color reproducibility of the display panel 110 may be reduced due to the reflection of light at the front or the side of the display panel 110. Thus the characteristics of black levels capable of being implemented by the display panel 110 may act as an important factor in the image quality.

Figure 29:
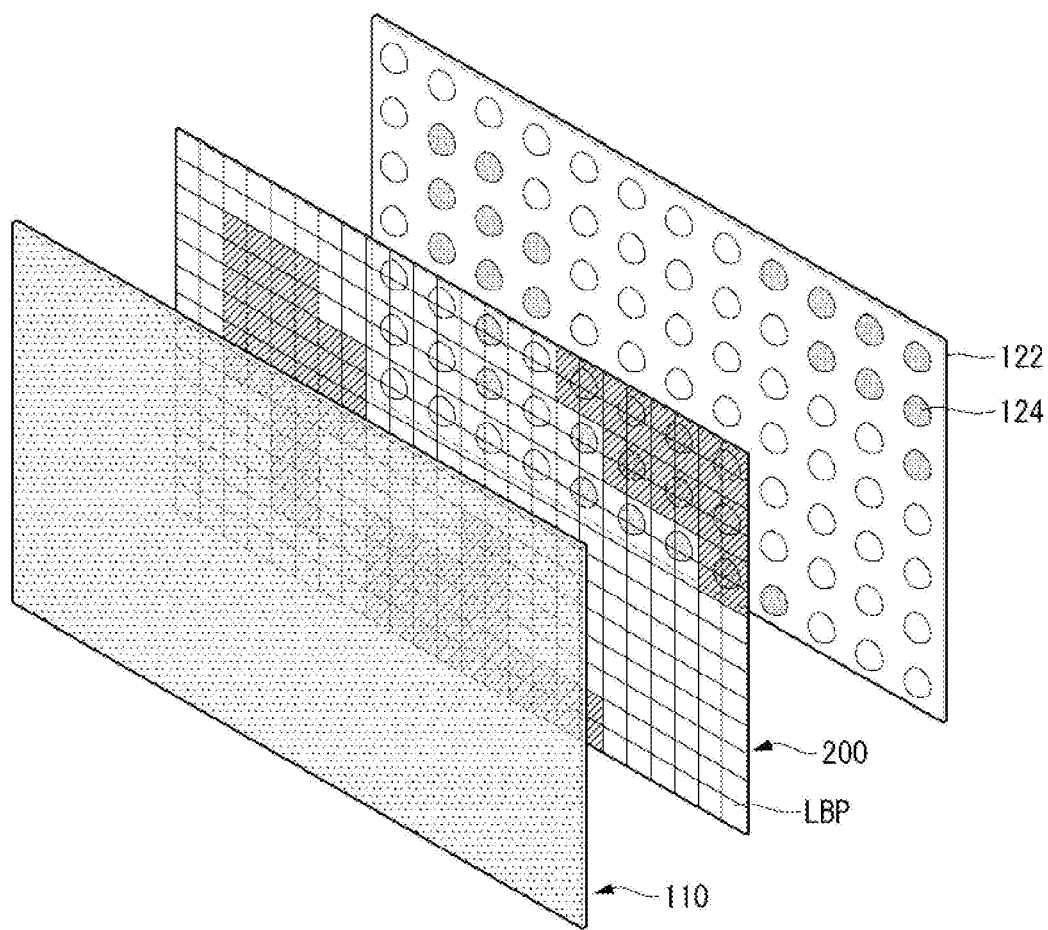

Referring to the embodiment of FIG. 29, the light shielding layer 200 may be positioned between the display panel 110 and light assemblies 124, and a matrix of the light shielding pixels LBP may have more rows and columns than a matrix of the plurality of light assemblies 124.

For example, when the matrix of the light shielding pixels LBP is 14×24, the matrix of the plurality of light assemblies 124 may be 7×12. Hence, a higher density of light shielding layer 200 corresponds to each of the plurality of light assemblies 124 and can implement local diming in more detail.

As a result, color reproducibility or color representation of the display panel 110 can be further improved.

Figure 30:
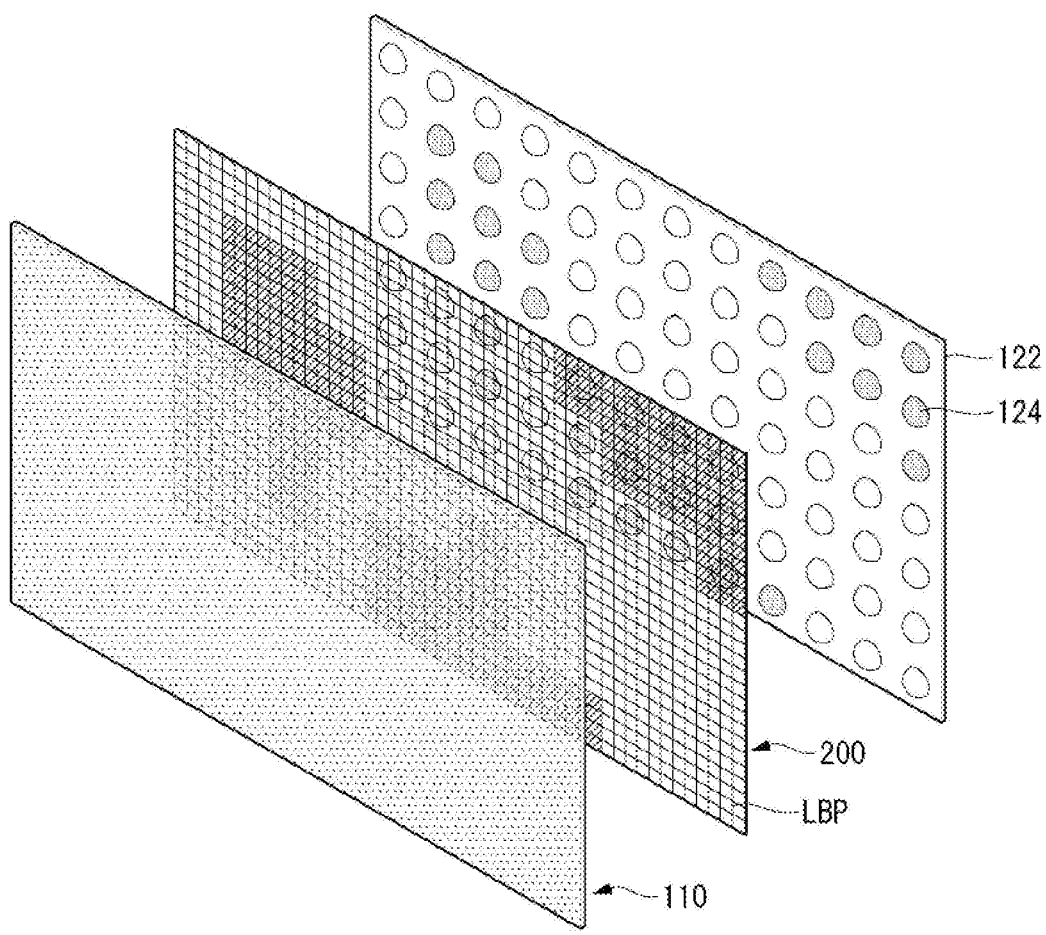

Referring to the embodiment of FIG. 30, the light shielding layer 200 may be positioned between the display panel 110 and light assemblies 124, and a matrix of the light shielding pixels LBP may have more rows and columns than a matrix of the plurality of light assemblies 124.

For example, when the matrix of the light shielding pixels LBP is 21×36, the matrix of the plurality of light assemblies 124 may be 7×12. Hence, a higher density of the light shielding layer 200 corresponds to each of the plurality of light assemblies 124 and can implement the local diming in more detail.

As a result, color reproducibility or color representation of the display panel 110 can be further improved.

As another example, a matrix of the light shielding pixels LBP may correspond to a matrix of pixels of the display panel 110.

As another example, a matrix of the light shielding pixels LBP may be less than the number of pixels of the display panel 110 or may be more than the number of plurality of light assemblies 124.

Figure 31:
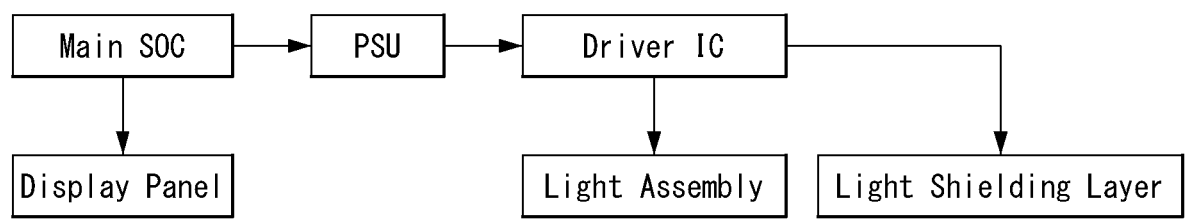
FIG. 31 illustrates an example of configuration for driving a display panel and a light shielding layer according to embodiments of the present disclosure.

Referring to FIG. 31, a first signal may be transferred from a main SOC to the display panel 110. The first signal may be for driving the display panel, and thus the display panel 110 may display an image.

A second signal may be transferred from the main SOC to a driver IC via a power supply unit (PSU). The driver IC may transfer the second signals to the light assemblies 124 and the light shielding layer 200. The second signals transferred to the light assemblies 124 and the light shielding layer 200 by the driver IC may be the same signal or an interworking signal.

Hence, the local dimming through the light assemblies 124 and the light shielding layer 200 can be implemented at the same time as the driving of the display panel 110. Further, the light shielding layer 200 can be efficiently controlled without a voltage difference generated when a signal is directly transferred from the main SOC to the light shielding layer 200.

Figure 32:
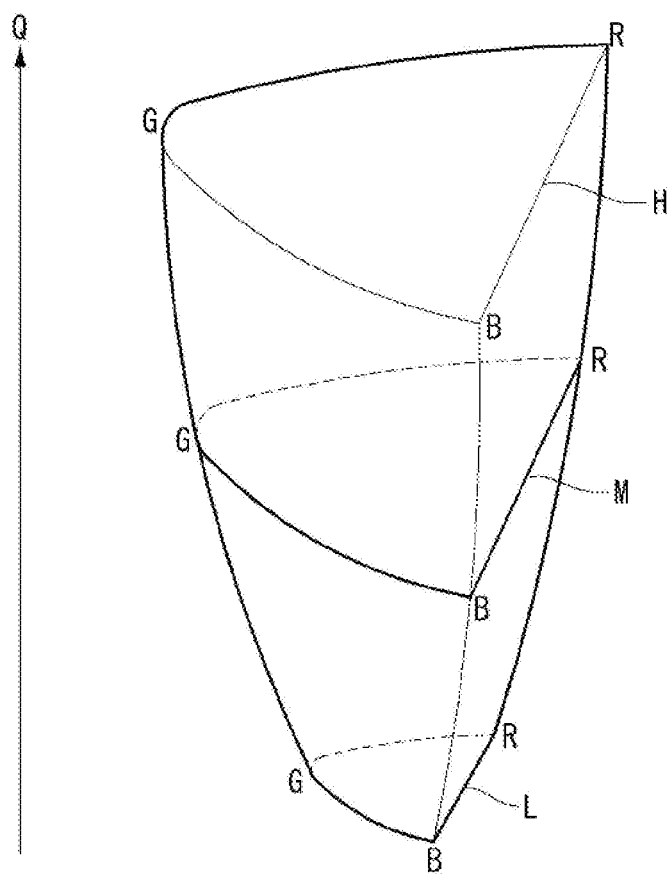
FIGS. 32 and 33 illustrate examples of color reproducibility of an image provided by a display device according to embodiments of the present disclosure.

FIG. 32 illustrates an example of a stereoscopic diagram of color coordinates implemented in local dimming when a display panel does not include a light shielding layer. In FIG. 32, the Q-axis indicates brightness of an image displayed on the display panel.

As can be seen from FIG. 32, a color volume of RGB at a middle gray level M is reduced as compared to a color volume of RGB at a high gray level H. Further, a color volume of RGB at a low gray level L is reduced as compared to the color volume of RGB at the middle gray level M. That is, as brightness (gray level) of light provided by the display panel 110 is reduced, the color volume of RGB is reduced. This means that the color reproducibility capable of being implemented by the display panel 110 is reduced.

Figure 33:
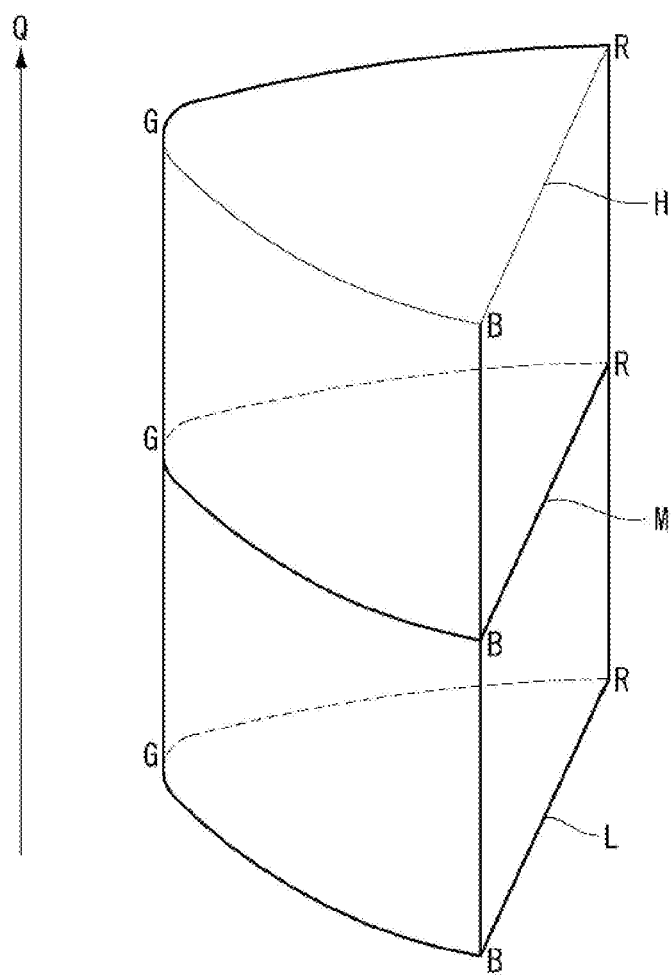

FIG. 33 illustrates an example of a stereoscopic diagram of color coordinates implemented in local dimming when a display panel 110 includes a light shielding layer 200. In FIG. 332, the Q-axis indicates brightness of an image displayed on the display panel.

As can be seen from FIG. 33, a color volume of RGB at a middle gray level M is maintained as compared to a color volume of RGB at a high gray level H. Further, a color volume of RGB at a low gray level L is maintained as compared to the color volume of RGB at the middle gray level M. That is, even if brightness (gray level) of light provided by the display panel 110 is reduced, the color volume of RGB can be maintained. This means that the color reproducibility capable of being implemented by the display panel 110 is improved.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of the disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed:

1. A display device comprising:
a display panel;
a plurality of light assemblies configured to provide light to the display panel;
a light absorbing layer positioned on a path of light that is provided to the display panel by the plurality of light assemblies, the light absorbing layer configured to absorb light of a predetermined wavelength range; and
a light shielding layer between the light assembly and the display panel,
wherein the light shielding layer is configured to simultaneously shield the light provided by the plurality of light assemblies at a first portion and allow the light provided by the plurality of light assemblies to pass at a second portion,
wherein a matrix of light shielding pixels of the light shielding layer corresponds to a matrix of pixels of the display panel,
wherein the display panel comprises a front substrate and a rear substrate disposed behind the front substrate,
wherein a front surface of the light shielding layer is directly disposed on a rear surface of the display panel, and
wherein when power is provided to a first area of the plurality of light assemblies and is blocked from being provided to a second area of the plurality of light assemblies, the first portion of the light shielding layer corresponds to the second area of the plurality of light assemblies, and the second portion of the light shielding layer corresponds to the first area of the plurality of light assemblies.

2. The display device of claim 1,
wherein the light absorbing layer is positioned in front of the front substrate.

3. The display device of claim 1, wherein the display panel further comprises:
a front polarizing layer at a front surface of the front substrate; and
a rear polarizing layer at a rear surface of the rear substrate,
wherein the light shielding layer is directly attached to the rear polarizing layer.

4. The display device of claim 1, wherein the light shielding layer includes:
a front film;
a rear film;
a liquid crystal layer between the front film and the rear film; and
a thin film transistor (TFT) on the front film or the rear film, wherein the TFT is configured to control a voltage provided to the liquid crystal layer.

5. The display device of claim 4, further comprising:
a common electrode at a rear surface of the front film; and
a pixel electrode at a front surface of the rear film,
wherein the TFT is positioned at the front surface of the rear film and is electrically connected to the pixel electrode.

6. The display device of claim 5, further comprising a sealant between the front film and the rear film and positioned toward an outer edge of the display panel,
   wherein the sealant fixes the front film and the rear film together and seals the liquid crystal layer.

7. The display device of claim 6, further comprising:
   a connection pad adjacent to one end of the rear film, wherein the connection pad is positioned at the front surface of the rear film and electrically connected to the TFT; and
   a wire electrically connected to the connection pad.

8. The display device of claim 1, wherein the plurality of light assemblies form a first matrix,
   wherein the light shielding layer includes a plurality of light shielding pixels that form a second matrix,
   wherein each light shielding pixel is configured to selectively shield light.

9. The display device of claim 8, wherein a number of light shielding pixels of the second matrix is equal to a number of light assemblies of the first matrix.

10. The display device of claim 8, wherein a number of light shielding pixels of the second matrix is greater than a number of light assemblies of the first matrix.

11. The display device of claim 8, wherein a number of light shielding pixels of the second matrix is less than a number of pixels of the display panel.

12. The display device of claim 1, wherein the plurality of light assemblies are configured to provide light in which an intensity of green-based light is 25% to 38% of an intensity of blue-based light and an intensity of red-based light is 14% to 32% of the intensity of blue-based light.

13. The display device of claim 1, wherein the light absorbing layer absorbs light in a wavelength band between 540 nm and 600 nm,
   wherein the plurality of light assemblies are configured to provide light in which an intensity of green-based light is 25% to 38% of an intensity of blue-based light and an intensity of red-based light is 14% to 32% of the intensity of blue-based light.

14. The display device of claim 1, wherein the plurality of light assemblies are configured to provide light in which an intensity of green-based light is about 31% of an intensity of blue-based light and an intensity of red-based light is about 20% of the intensity of blue-based light.

15. The display device of claim 1, wherein each of the plurality of light assemblies includes:
   a light source configured to provide blue-based light;
   an encapsulant covering the light source; and
   yellow-based and red-based fluorescent substances distributed within the encapsulant,
   wherein a mixture ratio of the yellow-based fluorescent substance to the red-based fluorescent substance is in a range of 0.42:0.37 to 0.62:0.57.

16. The display device of claim 1, wherein each of the plurality of light assemblies includes:
   a light source configured to provide blue-based light;
   an encapsulant covering the light source; and
   yellow-based and red-based fluorescent substances distributed within the encapsulant,
   wherein a ratio of the yellow-based fluorescent substance to the red-based fluorescent substance is in a range of 1:0.71 to 1:0.93.

17. The display device of claim 1, wherein each of the plurality of light assemblies includes:
   a light source configured to provide blue-based light;
   an encapsulant covering the light source; and
   yellow-based and red-based fluorescent substances distributed within the encapsulant,
   wherein the yellow-based and red-based fluorescent substances makes up 4.2 to 6.8% of the encapsulant.

18. The display device of claim 1, wherein a color temperature of an image provided by the display panel is 10,000 to 12,000 K.

19. The display device of claim 1, further comprising a driver integrated circuit configured to provide a driving signal to both the plurality of light assemblies and the light shielding layer.

20. The display device of claim 19, wherein the driving signal causes the first portion of the light shielding layer to shield light and one or more light assemblies of the plurality of light assemblies corresponding to the first portion to stop providing light to the display panel.

* * * * *